US006968533B1

(12) United States Patent
Ueda et al.

(10) Patent No.: US 6,968,533 B1
(45) Date of Patent: Nov. 22, 2005

(54) PROCESS DESCRIPTION APPARATUS AND METHOD, AND PROCESS CLASSIFICATION METHOD

(75) Inventors: Manabu Ueda, Nakai-machi (JP); Kazuto Hayashi, Nakai-machi (JP); Masamichi Takahashi, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 725 days.

(21) Appl. No.: 09/723,239

(22) Filed: Nov. 28, 2000

(30) Foreign Application Priority Data

Jan. 19, 2000 (JP) .......................................... 200-014107
Sep. 14, 2000 (JP) ....................................... 2000-280252

(51) Int. Cl.⁷ .......................... G06F 9/44; G06F 17/00; G06F 15/18; G06N 5/00; G06N 7/00
(52) U.S. Cl. .......................... 717/100; 717/106; 706/46
(58) Field of Search .............................. 706/59, 55, 20, 706/46, 48, 61; 703/2; 345/776; 717/100, 106

(56) References Cited

U.S. PATENT DOCUMENTS

| | | | | | |
|---|---|---|---|---|---|
| 4,595,982 | A | * | 6/1986 | Burt .............................. | 706/46 |
| 4,757,506 | A | * | 7/1988 | Heichler ..................... | 714/795 |
| 5,265,222 | A | * | 11/1993 | Nishiya et al. ............... | 706/10 |
| 5,535,393 | A | * | 7/1996 | Reeve et al. ................. | 717/149 |
| 5,632,022 | A | * | 5/1997 | Warren et al. .............. | 345/776 |
| 5,652,554 | A | * | 7/1997 | Krieg et al. .............. | 333/21 R |
| 5,808,914 | A | * | 9/1998 | Shin et al. ...................... | 703/2 |
| 5,819,270 | A | * | 10/1998 | Malone et al. ................. | 707/7 |
| 6,070,163 | A | | 5/2000 | Malone et al. ................. | 707/3 |
| 6,556,983 | B1 | * | 4/2003 | Altschuler et al. ............ | 706/55 |

OTHER PUBLICATIONS

R. Orfali, D. Harkey, J. Edwards, "The Essential Distributed Objects Survival Guide", pp 36–37, 154, 422, 457.*
Noik; Challenges in Graph–Based Relational Data Visualization; Proceedings of the 1992 Conference of the Centre for Advanced Studies on Collaborative Research; vol. 1; Nov. 1992; pp 259–277.*
Czedo et al; Semantics of Update Operations for an Etended Entity–Relationship Model; Proceedings of the 1988 ACM Sixteenth Annual Conference on Computer Science; Feb. 1988; pp 178–187.*
Liu et al; Database Schema Evolution Using EVER Diagrams; Proc edings of th Workshop on Advanced Visual Interfaces; Jun. 1994.*
Gaines; Logical foundations for knowledge representation in intelligent systems; Proceedings of the ACM SIGART international symposium on Methodologies for intelligent systems; Dec. 1986.*

(Continued)

Primary Examiner—Anthony Knight
Assistant Examiner—Meltin Bell
(74) Attorney, Agent, or Firm—Oliff & Berridge, PLC

(57) ABSTRACT

A process is described based on activities and dependence relationship between the activities. The dependence relationship is described based on resource and coordination method. An epistemological ground is set corresponding to the domain of the process and other components of the process are described for each epistemological ground. The epistemological grounds are classified according to abstract-concrete relationship, inclusion relationship, cluster relationship, etc., and are retrieved. The activity, dependence relationship, and resource also have classification structures. Setting an epistemological ground or using a global epistemological ground, the activity, dependence relationship, and resource are defined and the process is described and analyzed.

37 Claims, 31 Drawing Sheets

OTHER PUBLICATIONS

R. Orfali, D. Harkey, J. Edwards, "The Essential Distributed Objects Survival Guide", 1996.*

Noik; Challenges in Graph–Based Relational Data Visualization; Proceedings of the 1992 Conference of the Centre for Advanced Studies on Collaborative Research; vol. 1; Nov. 1992.*

Czedo et al; Semantics of Update Operations for an Etended Entity–Relationship Model; Proceedings of the 1988 ACM Sixteenth Annual Conference on Computer Science; Feb. 1988.*

T.W. Malone, K. Crowston, Jintae Lee, B. Pentland, C. Dellarocas, G. Wyner, J. Quimby, C.S. Osborn, A. Bernstein, G. Herman, M. Klein, and E. O'Donnell, "Tools for inventing organizations: toward a handbook of organizational processes", Management Science.*

R. Orfali, D. Harkey, J. Edwards, "The Essential Distributed Objects Survival Guide", 1996.*

"The Interdisciplinary Study of Coordination", Malone et al., Nov. 1993, pp 1–40.

"Tools for inventing organizations: Toward a handbook of organizational processes", Malone et al., May 1993, pp 1–20.

"Object–Oriented Software Engineering A Use Case Driven Approach", Jacobson et al., Jun. 1992, pp 109–152.

"Tools for inventing organizations: Toward a handbook of organizational processes", Malone et al., Revised Oct. 1998, pp 1–22.

"The Interdisciplinary Study of Coordination", Malone et al., Nov. 1993.

"Tools for inventing organizations: Toward a handbook of organizational processes", Malone et al., May 1993.

"Object–Oriented Software Engineering A Use Case Driven Approach", Jacobson et al.

"Tools for inventing organizations: Toward a handbook of organizational processes", Malone et al., Revised Oct. 1998.

* cited by examiner

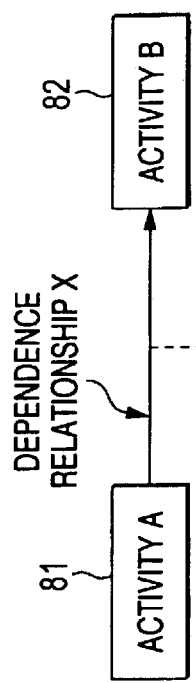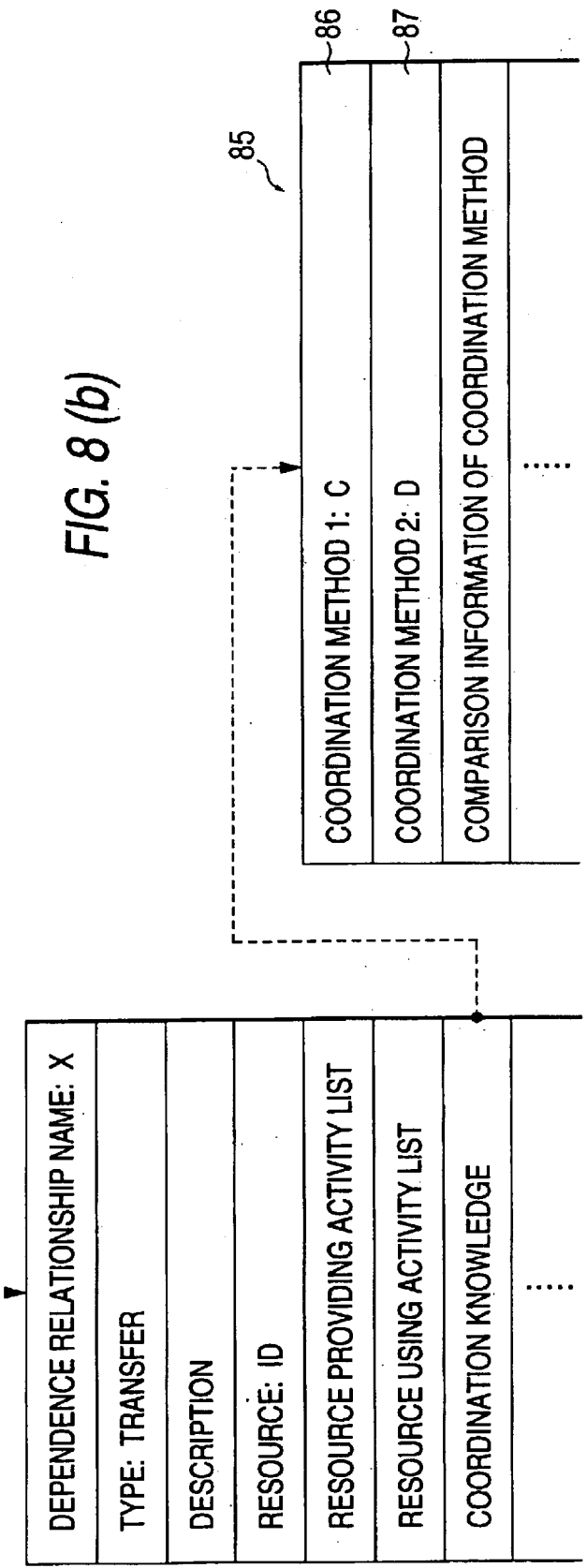
FIG. 8 (a)
FIG. 8 (b)

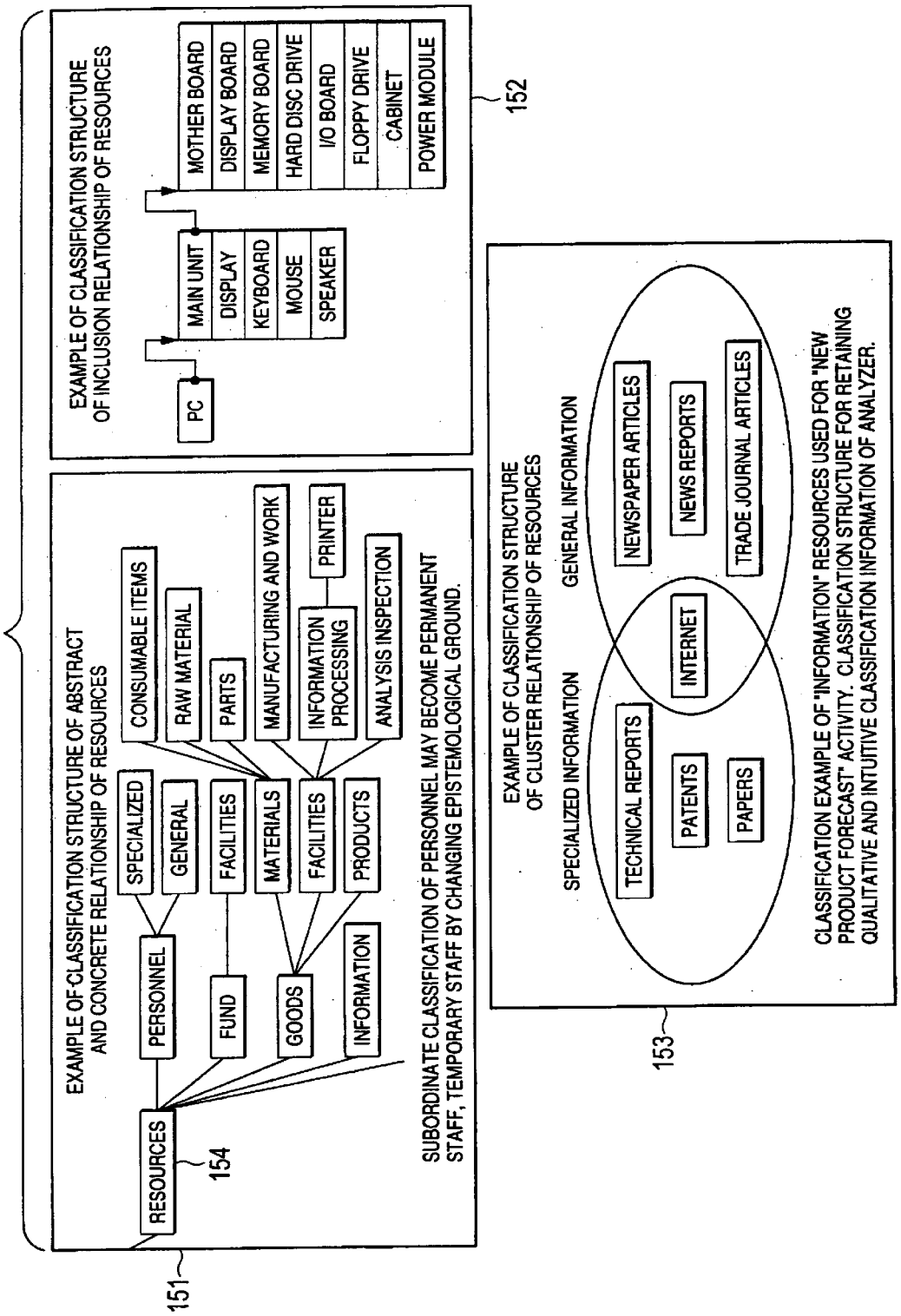

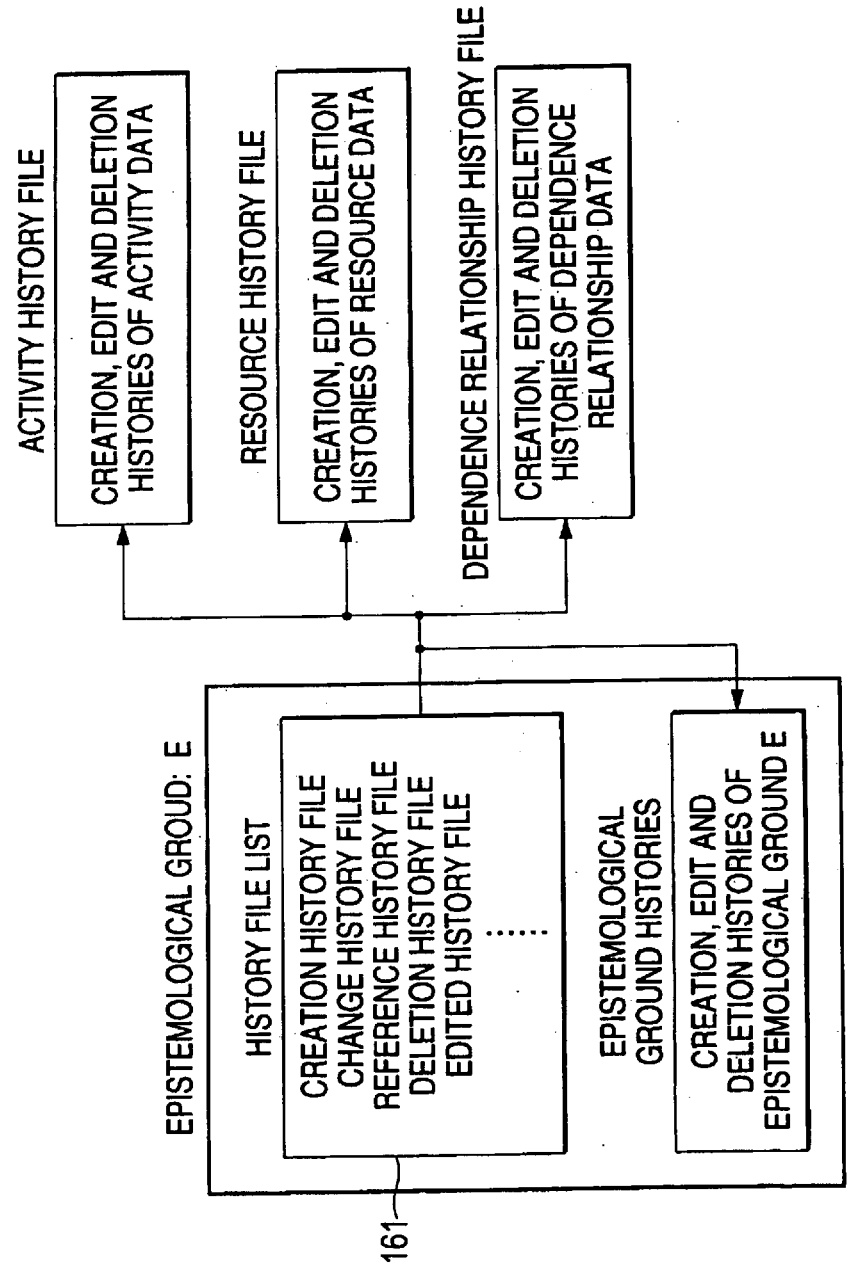
FIG. 16 CLASSIFICATION OF HISTORY INFORMATION

FIG. 17

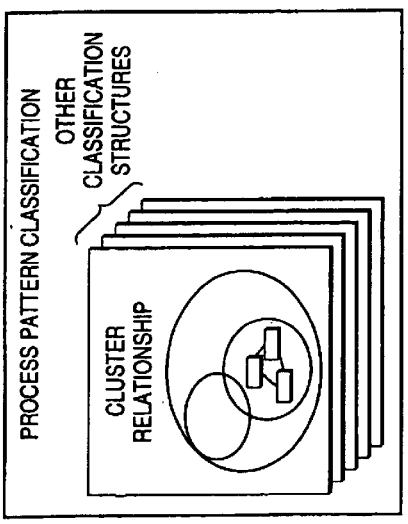

EXAMPLE OF CLUSTER FOR CLASSIFYING PROCESS PATTERNS

SUCH PROCESS PATTERN WHICH BECOMES WELL-WORN MEANS UNDER ONE CONDITION CORRESPONDS MAINLY TO COORDINATION METHOD (= ACTIVITY) OF DEPENDENCE RELATIONSHIP. IN THE FOLLOWING EXAMPLE, IT BECOMES A SET OF CLASSIFICATIONS CORRESPONDING TO CELLS OF MATRIX PROVIDED BY COMBINING SUPERORDINATE CONCEPTS SUCH AS L, M, N, O (L x M x N x O), FOR EXAMPLE, IN GLOBAL EPISTEMOLOGICAL GROUND.

| RESOURCE CHARACTERISTIC: L | DEPENDENCE RELATIONSHIP: M | ACTIVITY-TO-ACTIVITY CHARACTERISTIC: N | PRIORITY CONDITION: O |
|---|---|---|---|
| SPACE RESOURCES | TRANSFER | RESOURCE PROVIDING ACTIVITY LEADING | DELIVERY TIME |
| TIME RESOURCES | BINDING | RESOURCE USING ACTIVITY LEADING | COSTS |
| ENERGY RESOURCES (ELECTRICITY, FUEL, ETC.) | DISTRIBUTION | INTERDEPENDENCE | QUALITY |
| MATTER RESOURCES (MATERIAL, TOOLS, ETC.) | BINDING AND DISTRIBUTION | .... | STABILIZATION |
| INFORMATION RESOURCES | BINDING AND TRANSFER |  | QUICK RESPONSE |
| PROCESSING RESOURCES (PERSONNEL, PROGRAMS, ETC.) | TRANSFER AND DISTRIBUTION |  | INDIVIDUAL DEAL POWER |
| .... | .... |  | .... |

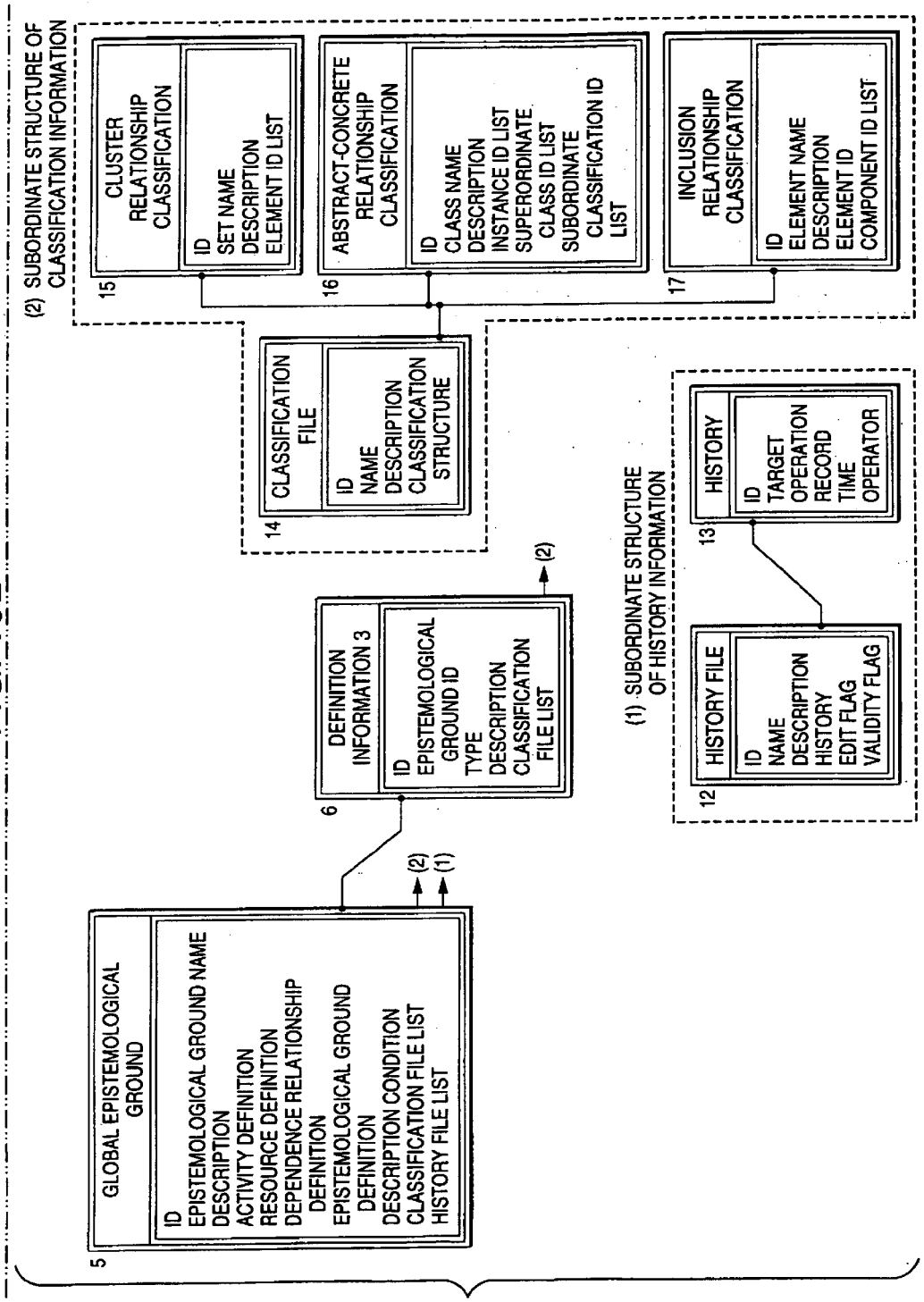

FIG. 20A

ACTIVITY ⎯ 231

| FIELD NAME | DESCRIPTION |
|---|---|
| ID | ID |
| EPISTEMOLOGICAL GROUND ID | ID OF EPISTEMOLOGICAL GROUND TO WHICH THE ACTIVITY BELONGS |
| NAME | NAME OF RESOURCE (NOT DUPLICATE IN THE EPISTEMOLOGICAL GROUND TO WHICH THE ACTIVITY BELONGS) |
| DESCRIPTION | DESCRIPTION OF FEATURES OF THE ACTIVITY AND DIRECT LINKS TO ACTIVITY IDS IN UP AND DOWN AND LEFT AND RIGHT RELATIONSHIPS OF CLASSIFICATION STRUCTURE |
| PROVIDED RESOURCE LIST | LIST OF PROVIDED RESOURCE IDS |
| USED RESOURCE LIST | LIST OF USED RESOURCE IDS |
| RESOURCE CHARACTERISTICS | DESCRIPTION OF USED OR PROVIDED RESOURCE TYPES, INTERNAL ATTRIBUTES AND RELATIONSHIP BETWEEN RESOURCES |
| CLASSIFICATION FILE LIST | LIST OF CLASSIFICATION FILE IDS |
| HISTORY FILE | CREATION HISTORY |

DEPENDENCE RELATIONSHIP ⎯ 232

| FIELD NAME | DESCRIPTION |
|---|---|
| ID | ID |
| EPISTEMOLOGICAL GROUND ID | ID OF EPISTEMOLOGICAL GROUND TO WHICH THE DEPENDENCE RELATIONSHIP BELONGS |
| DEPENDENCE RELATIONSHIP TYPE | ONE OF SIX DEPENDENCE RELATIONSHIP TYPES (TRANSFER, BINDING, DISTRIBUTION, BINDING AND TRANSFER, TRANSFER AND DISTRIBUTION, BINDING AND DISTRIBUTION) |
| NAME | NAME OF DEPENDENCE RELATIONSHIP (NOT DUPLICATE IN THE EPISTEMOLOGICAL GROUND TO WHICH THE DEPENDENCE RELATIONSHIP BELONGS) |
| DESCRIPTION | DESCTIPTION OF FEATURES OF THE DEPENDENCE RELATIONSHIP AND DIRECT LINKS TO DEPENDENCE RELATIONSHIP IDS IN UP AND DOWN AND LEFT AND RIGHT RELATIONSHIPS OF CLASSIFICATION STRUCTURE |
| RESOURCE ID | INTERVENING RESOURCE ID |
| RESOURCE PROVIDING ACTIVITY LIST | LIST OF RESOURCE PROVIDING ACTIVITY IDS |
| RESOURCE USING ACTIVITY LIST | LIST OF RESOURCE USING ACTIVITY IDS |
| COORDINATION KNOWLEDGE | A PLURALITY OF COORDINATION METHODS FOR COORDINATING INDEPENDENCE RELATIONSHIP AND COORDINATION METHOD COMPARISON INFORMATION (POINTERS TO DOCUMENTS, FIGURES AND TABLES, PROCESS DESCRIPTION DATA) |
| CLASSIFICATION FILE LIST | LIST OF CLASSIFICATION FILE IDS |
| HISTORY FILE | CREATION HISTORY |

FIG. 20B

RESOURCE  233

| FIELD NAME | DESCRIPTION |
|---|---|
| ID | ID |
| EPISTEMOLOGICAL GROUND ID | ID OF EPISTEMOLOGICAL GROUND TO WHICH THE RESOURCE BELONGS |
| NAME | NAME OF RESOURCE (NOT DUPLICATE IN THE EPISTEMOLOGICAL GROUND TO WHICH THE RESOURCE BELONGS) |
| DESCRIPTION | DESCRIPTION OF FEATURES OF THE RESOURCE AND DIRECT LINKS TO RESOURCE IDS IN UP AND DOWN AND LEFT AND RIGHT RELATIONSHIPS OF CLASSIFICATION STRUCTURE |
| CLASSIFICATION FILE LIST | LIST OF CLASSIFICATION FILE IDS |
| HISTORY FILE LIST | CREATION HISTORY |

EPISTEMOLOGICAL GROUND  234

| FIELD NAME | DESCRIPTION |
|---|---|
| ID | ID |
| EPISTEMOLOGICAL GROUND NAME | NAME OF EPISTEMOLOGICAL GROUND (NOT ALLOWED TO BE DUPLICATE IN SUBORDINATE CLASSIFICATION IN ONE EPISTEMOLOGICAL GROUND) |
| DESCRIPTION | DESCRIPTION OF FEATURES OF THE EPISTEMOLOGICAL GROUND AND DIRECT LINKS TO EPISTEMOLOGICAL GROUND IDS IN UP AND DOWN AND LEFT AND RIGHT RELATIONSHIPS OF CLASSIFICATION STRUCTURE |
| ACTIVITY DEFINITION | DEFINITION CONCERNING DESCRIPTION OF ACTIVITY CREATED IN THE EPISTEMOLOGICAL GROUND (TYPE, GRANULARITY, CLASSIFICATION CONDITIONS, ETC.) |
| RESOURCE DEFINITION | DEFINITION CONCERNING DESCRIPTION OF RESOURCE CREATED IN THE EPISTEMOLOGICAL GROUND (TYPE, GRANULARITY, CLASSIFICATION CONDITIONS, ETC.) |
| DEPENDENCE RELATIONSHIP DEFINITION | DEFINITION CONCERNING DESCRIPTION OF DEPENDENCE RELATIONSHIP CREATED IN THE EPISTEMOLOGICAL GROUND (TYPE, GRANULARITY, CLASSIFICATION CONDITIONS, ETC.) |
| DESCRIPTION CONDITION | CONSTRAINTS NOT CONTAINED IN THE THREE ABOVE-DESCRIBED DEFINITIONS FOR DESCRIBING PROCESS IN THE EPISTEMOLOGICAL GROUND |
| CLASSIFICATION FILE LIST | LIST OF CLASSIFICATION FILE IDS CONCERNING ACTIVITIES, RESOURCES, DEPENDENCE RELATIONSHIPS AND THEIR ATTRIBUTES |
| HISTORY FILE LIST | LIST OF HISTORY FILE IDS OF WORK HISTORIES, ANALYSIS STEPS EDITED FOR ANALYSIS, AND THE LIKE ON THE EPISTEMOLOGICAL GROUND |

FIG. 21A

CLASSIFICATION FILE — 235

| FIELD NAME | DESCRIPTION |
|---|---|
| ID | ID |
| NAME | NAME OF CLASSIFICATION |
| DESCRIPTION | DESCRIPTION OF CLASSIFICATION |
| CLASSIFICATION STRUCTURE | IDS OF VARIOUS TABLES OF CLASSIFICATION STRUCTURES (CLUSTER, INCLUSION, ABSTRACT-CONCRETE RELATIONSHIP, PATTERN, ETC.) |

CLUSTER RELATIONSHIP CLASSIFICATION — 236

| FIELD NAME | DESCRIPTION |
|---|---|
| ID | ID |
| SET NAME | NAME OF SET |
| DESCRIPTION | DESCRIPTION OF SET<br>DESCRIPTION OF CONDITIONS OF DATA THAT CAN BE CLASSIFIED AS ELEMENTS OF THE SET AND THE LIKE |
| ELEMENT ID LIST | LIST OF ELEMENT DATA IDS |

INCLUSION RELATIONSHIP CLASSIFICATION — 237

| FIELD NAME | DESCRIPTION |
|---|---|
| ID | ID |
| ELEMENT NAME | NAME OF INCLUDING PARTY<br>IF ELEMENT EXISTS, "EPISTEMOLOGICAL GROUND NAME: ELEMENT NAME" |
| DESCRIPTION | DESCRIPTION OF INCLUSION RELATIONSHIP<br>FOR ACTIVITY, DESCRIPTION OF CHARACTERISTICS OF SUBACTIVITY GROUP; FOR RESOURCE, DESCRIPTION OF CHARACTERISTICS OF COMPONENT GROUP |
| ELEMENT ID | DATA ID WHEN INCLUDING PARTY EXISTS AS ACTUAL DATA |
| COMPONENT OF ID LIST | LIST OF IDS OF DATA OF COMPONENTS |

FIG. 21B

ABSTRACT-CONCRETE RELATIONSHIP CLASSIFICATION  — 238

| FIELD NAME | DESCRIPTION |
|---|---|
| ID | ID |
| CLASS NAME | NAME OF CLUSTER |
| DESCRIPTION | DESCRIPTION OF CONDITIONS OF ELEMENTS THAT CAN BE CLASSIFIED AS INSTANCE OF THE CLASS AND THE LIKE |
| INSTANCE ID LIST | LIST OF DATA IDS AS INSTANCE |
| SUPERORDINATE CLASS ID LIST | LIST OF SUPERORDINATE CLASS IDS (SINGLE INHERITANCE IF TWO OR MORE IDS ARE NOT ALLOWED) |
| SUBORDINATE CLASSIFICATION ID LIST | LIST OF SUBORDINATE CLASS IDS |

ACTIVITY-RESOURCE LIST  — 239

| FIELD NAME | DESCRIPTION |
|---|---|
| ID | ID |
| ACTIVITY ID | |
| RESOURCE ID | |
| PROVIDE/USE FLAG | FLAG INDICATING WHETHER THE ABOVE-MENTIONED ACTIVITY PROVIDES OR USES THE ABOVE-MENTIONED RESOURCE |

ACTIVITY-DEPENDENCE RELATIONSHIP LIST  — 240

| FIELD NAME | DESCRIPTION |
|---|---|
| ID | ID |
| ACTIVITY ID | |
| RESOURCE ID | . |
| PROVIDE/USE FLAG | FLAG INDICATING WHETHER THE ABOVE-MENTIONED ACTIVITY IS A PROVIDING OR USING ACTIVITY IN THE ABOVE-MENTIONED DEPENDENCE RELATIONSHIP |
| | |

FIG. 22A

GLOBAL EPISTEMOLOGICAL GROUND  241

| FIELD NAME | DESCRIPTION |
|---|---|
| ID | ID |
| EPISTEMOLOGICAL GROUND NAME | "GLOBAL EPISTEMOLOGICAL GROUND" |
| DESCRIPTION | DESCRIPTION OF FEATURES OF GLOBAL EPISTEMOLOGICAL GROUND |
| ACTIVITY DEFINITION | DEFINITION CONCERNING DESCRIPTION OF ACTIVITY GENERATED AS DEFAULT STATE |
| RESOURCE DEFINITION | DEFINITION CONCERNING DESCRIPTION OF RESOURCE GENERATED AS DEFAULT STATE |
| DEPENDENCE RELATIONSHIP DEFINITION | DEFINITION CONCERNING DESCRIPTION OF DEPENDENCE RELATIONSHIP GENERATED AS DEFAULT STATE |
| EPISTEMOLOGICAL GROUND DEFINITION | DEFINITION CONCERNING DESCRIPTION OF EPISTEMOLOGICAL GROUND GENERATED AS DEFAULT STATE |
| DESCRIPTION CONDITION | CONSTRAINTS NOT CONTAINED IN THE FOUR ABOVE-DESCRIBED DEFINITIONS FOR DESCRIBING PROCESS ON GLOBAL EPISTEMOLOGICAL GROUND |
| CLASSIFICATION FILE LIST | LIST OF CLASSIFICATION FILE IDS CONCERNING ACTIVITIES, RESOURCES, DEPENDENCE RELATIONSHIPS AND THEIR ATTRIBUTES |
| HISTORY FILE LIST | LIST OF HISTORY FILE IDS OF WORK HISTORIES, ANALYSIS STEPS EDITED FOR ANALYSIS AND THE LIKE ON GLOBAL EPISTEMOLOGICAL GROUND |

DEFINITION INFORMATION  242

| FIELD NAME | DESCRIPTION |
|---|---|
| ID | ID |
| EPISTEMOLOGICAL GROUND ID | ID OF EPISTEMOLOGICAL GROUND TO WHICH DEFINITION INFORMATION BELONGS |
| TYPE | ONE OF ACTIVITY, RESOURCE, DEPENDENCE RELATIONSHIP AND EPISTEMOLOGICAL GROUND |
| DESCRIPTION | DESCRIPTION OF RULES AND CONSTRAINTS ON CREATING AND USING DATA OF THE ABOVE-MENTIONED TYPE |
| CLASSIFICATION FILE LIST | LIST OF CLASSIFICATION FILE IDS WHERE GENERATED DATA MUST BE REGISTERED |

FIG. 22B

HISTORY FILE  /—243

| FIELD NAME | DESCRIPTION |
|---|---|
| ID | ID |
| NAME | NAME OF HISTORY |
| DESCRIPTION | DESCRIPTION OF HISTORY |
| HISTORY | ID OF HISTORY TABLE |
| EDIT FLAG | FLAG INDICATING THAT HISTORY IS EDITED |
| VALIDITY FLAG | FLAG TO USE HISTORY AS ANALYSIS STEP |

HISTORY  /—244

| FIELD NAME | DESCRIPTION |
|---|---|
| ID | ID |
| TARGET | TYPE OF DATA RETAINED AS HISTORY TARGET (ACTIVITY, RESOURCE, DEPENDENCE RELATIONSHIP, EPISTEMOLOGICAL GROUND, OTHERS) |
| OPERATION | DESCRIPTION OF OPERATION TYPE SUCH AS GENERATION, EDIT OR DELETION |
| RECORD | RECORD INFORMATION (DIFFERENCE FROM THE PRECEDING STATE OR DATA CONCERNING THE STATE OF ONLY THE SPECIFIED TARGET) |
| TIME | TIME AT WHICH AUTOMATIC OR MANUAL HISTORY RETENTION WAS EXECUTED |
| OPERATOR | USER AT HISTORY CREATION TIME |
| | |

PROCESS DESCRIPTION APPARATUS AND METHOD, AND PROCESS CLASSIFICATION METHOD

BACKGROUND OF THE INVENTION

1. Field of Invention

This invention relates to a process description method and a process classification method intended for making it possible to make the most of knowledge about processes across fields by describing and classifying various processes existing in the real world based on commonality across fields.

This invention also relates to a process description method and a process classification method for aiding in analyzing and designing processes.

This invention further relates to a process description method and a process knowledge database for making it possible to make the most of processes and process coordination method across fields and areas by describing processes centering on the dependence relationship between activities independent of fields or areas and systematizing the described process knowledge using a plurality of classification structures responsive to purposes when putting various processes existing in the real world and coordination method for coordinating the processes input a database.

Hitherto, to describe a process, a description method and a classification method fitted for the purpose for each scientific field or industrial field has been adopted. The processes mentioned here refer to general processes modeled in a wide range of fields, such as a software program, a manufacturing process, a supply chain, a work flow, a business process, a circulation system of an ecological system, and homeostasis of living creatures.

The invention focuses attention on the fact that even processes in different fields are common in essential nature (dependence relationship between activities and method for coordinating the dependence relationship=process knowledge) across the fields, and makes it possible to make the most of the process knowledge mutually across the fields.

The process knowledge common across the fields is, for example, knowledge of arrival order processing of order jobs and knowledge about FIFO (first-in, first-out) in queue management of computers. The arrival order processing in order jobs is the same as the FIFO in queue management of computers. Thus, from the viewpoint of the process knowledge, it is desirable that the process knowledge can be used not only in each field, but also for mutual problem solution, hypothesis making, etc. However, hitherto, the process knowledge has been described for each field by the description method proper to each field, thus it has been difficult to mutually use the process knowledge.

In the invention, a process knowledge database is constructed by a description method capable of representing the process knowledge found and developed in various fields in common and a classification method for organizing relevant processes across the fields and process analysis and process design jobs are supported by making the most of the process knowledge database. process knowledge has been described for each field by the description method proper to each field, thus it has been difficult to mutually use the process knowledge.

In the invention, a process knowledge database is constructed by a description method capable of representing the process knowledge found and developed in various fields in common and a classification method for organizing relevant processes beyond the fields and process analysis and process design jobs are supported by making the most of the process knowledge database.

2. Description of Related Art

The following references are available as related arts:

Reference [1]

Malone, T. W. and Crowston, K.: The interdisciplinary study of coordination, ACM Computing Surveys, 26 (1), 87–119, November 1993

Reference [2]

Malone, T. W., Crowston, K., Lee, J. and Pentland, B.: "Tools for inventing organizations: Toward a handbook of organizational processes," In Proceedings of the $2^{nd}$ IEEE Workshop on Enabling Technologies Infrastructure for Collaborative Enterprises. Morgantown, W. Va., May 20–22, 1993

Reference [3]

Malone, T. W., Crowston, K., Lee, J., Pentland, B. and Dellarocas, C. Computer system for displaying representations of processes. U.S. Pat. No. 5,819,270 (Oct. 6, 1998)., Malone, T. W., Crowston, K., Lee, J., Pentland, B. and Dellarocas, C. A computerized handbook of processes. European Patent No. 0692113 (Oct. 14, 1998).

Reference [4]

Jacobson, I. Et al.: Object-Oriented Software Engineering-A Use Case Driven Approach, the ACM press, New York (1992). (Translated by NISHIOKA Toshihiro et al.: Object shikou software kougaku OOSE, Toppan (1995))

Reference [5]

OKABE Masao et al.: Object shikou modeling shuhou MELON; "Object shikou saizensen," subtitle "Jyouhou shori gakkai 96 symposium" (Sha) Jyouhou shori gakkai software kougaku kenkyukai Edited by AOYAMA Mikio and FUKASAWA Yoshiaki, Asakura Shoten, Jul. 5, 1996, first edition.

Reference [6]

Fujituu KK: Soshiki katudou database no kouchiku houhou, sorenishiyousuru bunseki sheet nonyuuryoku houhou oyobi soshiki katudou kanri system, Tokkyo kouhou dai 2923552 gou.

Reference [7]

Fujituu KK: Gyoumu object no jidouseiseisouchi oyobi houhou narabini gyoumu object seisei program wo kirokishita computer yomitorikanouna kirokubaitai, Koukai tokkyo kouhou Heisei 11-119987 gou Reference [8]

KK Hitachi seisakusho: Work flow system kaihatu shien houhou, Koukai tokkyo kouhou Heisei 11-085880 gou Reference [9]

Shimizu kensetu KK: Tougouteki seisan project jyouhou kanri system, Koukai tokkyo kouhou Heisei 6-044255 gou Reference [10]

KK Hitachi seisakusho: Jyouhou shori tejyun no seiseishouchi, Koukai tokkyo kouhou Shouwa 62-057023 gou Reference [11]

Thomas W. Malone, Kevin Growston, Jintae Lee, Brian Pentland, Chrysanthos Dellarocas, George Wyner, John Quimby, Charles S. Osborn, Abraham Bernstein, George Herman, Mark Klein, and Elissa O'Donnell: Tools for inventing organizations: Toward a handbook of organizational processes. Management Science 45(3) pp 425–443, October 1998

In techniques of describing and classifying process knowledge in related arts, databases proper to fields are developed by the process description methods dependent on the fields. (References 6, 9, and 10) However, even processes in different fields may be common in essential nature across the fields. For example, arrival order processing in order jobs is the same as FIFO (first-in, first-out) in queue management of computers. The study field of paying attention to such nature and describing process knowledge in various fields according to common model for attempting to clarify scientifically is coordination science in progress in MIT (Massachusetts Institute of Technology) (Reference 1). Coordination defined in the coordination science refers to "managing of dependence relationship between activities" and in the coordination science, this definition is called coordination theory. MIT obtains US and European patents relating to a process representation display system for describing and classifying job processes in various business categories in common based on the coordination theory (References 2 and 3). The processes described according to activities and the dependence relationship between the activities are classified only by two hierarchical structures of abstract-concrete form relationship (specialization) and part-whole relationship (decomposition). In a system developed in MIT (Reference 11), the basic types for classifying the dependence relationships between activities are three types of Flow, Fit, and Share.

On the other hand, in techniques relating to process description, particularly to information processes and human processes, the patents of describing processes using object-oriented models are mainstream at present (References 4, 5, 6, 7, and 9). The former patents are characterized by process description assuming a target domain and thus do not assume integrating of process descriptions of a plurality of different target domains. In one of the patents (Reference 6), processes are represented by verbs, objects of the verbs are limited to six types, and they are managed in a class hierarchy, whereby a work process database is realized.

In the object-oriented study conscious of target domains, a method of analyzing the characteristic of a target domain and then describing a model is under study. In OOSE by Jacobson, I. Et al. Reference 4), interaction with the system outside is described as a use case and an interface object is modeled as an analysis model based on the use case, then a real object corresponding to the real world is modeled. In multilevel recognition logic network MELON by OKABE Masao et al. (Reference 5), positioning of job domains is made clear, object of "role ground" is introduced as unit of dynamic behavior, and aside from the object, "atom object model" is introduced to share information, and the models are related to each other.

However, a problem of object-oriented models on integrally describing process knowledge lies in that if the number of targets to be modeled as object is regarded as plural or one because of the viewpoint difference between analyzers, analysis models must be again constructed individually because of the object definition difference. The reason is that in the object-oriented technique, subject of object is defined and a procedure is described as an attribute of the execution subject and thus if the subject differs, it must be described as another process.

In contrast, in the process description based on the coordination theory, a process is described centering on "activity" corresponding to a procedure in the object-oriented technique and is represented as the dependence relationship between activities. The execution subject is regarded as one of "resources" required for activity. Thus, if the subject differs, the dependence relationship between activities does not change. Thus, it is made possible to describe process knowledge across the field dependence.

For example, a supply chain in affiliated companies becomes a chain of companies if it is viewed in the object-oriented technique, but becomes the dependence relationship between business activities if it is viewed from the coordination theory. Therefore, one company farms out a part of activities as outsourcing or merges one affiliated company, an object-oriented model 18 needs to be again constructed; a model based on the coordination theory 19 can be handled as the same model unless the dependence relationship between activities changes. (FIG. 1)

In the related arts, the fields in which described processes exist are limited and thus an apparatus and method for systematically aiding in using the process knowledge across the fields cannot easily be constructed. Therefore, for example, a company consultant abstracts the processes in different business categories by experience for re-adaptation. However, this is limited to the field at which the consultant is good, and depends on the experience and the abstract capability of the consultant, thus variations of process propositions that can be selected are limited to the field and personal variations occur; this is a problem.

On the other hand, to describe processes in various fields and business categories integrally, the purpose, scale, resources, representation granularity, and the like of process description depend on the rationality of the party describing and using the process. Thus, if integrated description method and classification method are used for realization, all attributes and classification structures must be described integrally; this is also a problem.

SUMMARY OF THE INVENTION

It is therefore an object of the invention, to make the most of process knowledge across fields and areas by describing and classifying various processes existing in the real world according to common models in process description describing each process as the dependence relationship between activities, to make it possible to systematically classify common characteristics of process knowledge across fields while describing information of rational viewpoint (=epistemological ground) for modeling the process proper to each field by individually defining proper characteristics of fields and business categories to describe the processes.

In the invention, a unique process description method and classification method solving practical problems with reference to the known information concerning the coordination theory are realized on a computer system. To solve the problem involved in the above-mentioned US and European patents [3], namely, the problem wherein a plurality of model description and component classification methods become necessary for each viewpoint of recognition depending on the viewpoint of recognition of process analysis and to use only the two whole classification structures provided by the above-mentioned patents, component description attributes correspond to a plurality of recognition viewpoints and thus are enlarged redundantly or the classification reference becomes ambiguous because a plurality of recognition viewpoints are contained, in the invention, an epistemological ground of explicitly describing an epistemological viewpoint when a process is modeled is introduced, whereby a plurality of classification structures corresponding to the recognition viewpoint can be provided for each epistemological ground.

To the end, the invention adopts the configuration as follows.

According to the invention, there is provided a description method of describing a process based on "activity" forming a part of the process, "resource" transferred between the activities, "dependence relationship" between the activities via the resource, and "epistemological ground" to describe the characteristics and constraints proper to the field or business category to which the process belongs on describing the process as the components to describe the process, and a classification method of classifying the described processes based on elements of the components and element combinations.

Thus, each process in the real world can be modeled from the viewpoint of analysis appropriate for using the process (epistemological ground) and the components of the modeled process are classified across the epistemological ground, whereby a retrieval can be made from similarity and contrast on classification beyond fields, whereby it is made possible to use the process knowledge across fields for analyzing and designing the process.

Further, based on the epistemological ground, one process in the real world can also be described as different process models. For example, to model a business process in an arbitrary organization, if the epistemological ground is set from the viewpoint of personnel, the process can be modeled as the dependence relationship between jobs with persons as resources; if the epistemological ground is set from the viewpoint of finance, the process can be modeled as the dependence relationship between activities with funds and assets like cash flow as resources. Further, if the epistemological ground is set from the viewpoint of information processing, the process can be modeled as the dependence relationship between information processing activities with paper documents, files, etc., as resources. Thus, to analyze the same business process, individual description matching the viewpoint or purpose on managing and coordinating the process is made possible for each epistemological ground.

To the end, according to the invention, there is provided a process description apparatus for describing a process using a model wherein a plurality of activities have dependence relationship via a resource, the process description apparatus comprising: means for storing definition of an epistemological ground for a domain of the process to be described; means for storing attributes of the activities of the process to be described for each epistemological ground; means for storing the attributes of the resource of the process to be described for each epistemological ground; means for storing the attributes of the dependence relationship of the process to be described for each epistemological ground; and means for displaying the activities, the resource, and the dependence relationship as figure elements.

In the configuration, the activity, resource, and dependence relationship of the target process can be described for each viewpoint of process analysis or domain of the target process (epistemological ground) and the constraints, etc., of the domain are defined, whereby analysis appropriate for the domain can be made. It is also made possible to again use knowledge of processes belonging to different epistemological grounds by classifying the processes based on the activity, the resource, and the dependence relationship across fields. Formerly, it was difficult to use the knowledge about the processes in different domains.

In the configuration, at least one of the activities, the resource, and the dependence relationship may be displayed as a figure element. More than one dependence relationship between activities may exist, in which case the dependence relationship to be displayed may be selected by specifying the attribute and attribute value of the dependence relationship. The activity or the resource to be displayed may also be selected by specifying the attribute and attribute value thereof. In doing so, an appropriate display for the purpose and scene of analysis can be produced.

To the end, according to the invention, there is provided a process description apparatus for describing a process using a model wherein a plurality of activities have dependence relationship via a resource, the process description apparatus comprising: means for storing constraints of the process activities, resource. and dependence relationship under a predetermined domain identifier for the domain of the process to be described: means for assigning a domain identifier to the process to be described: means for describing the attributes of the activities of the process to be described under the constraints of the assigned domain identifier; means for describing the attributes of the resource of the process to be described under the constraints of the assigned domain identifier; means for describing the attributes of the dependence relationship of the process to be described under the constraints of the assigned domain identifier; and means for displaying at least one of the activities, the resource, and the dependence relationship as a figure element.

A means for storing constraints of the process activities, resource, and dependence relationship under a predetermined domain identifier for the domain of the process to be described; means for assigning a domain identifier to the process to be described.

In addition, a means for describing the attributes of the activities of the process to be described under the constraints of the assigned domain identifier, means for describing the attributes of the resource of the process to be described under the constraints of the assigned domain identifier; means for describing the attributes of the dependence relationship of the process to be described under the constraints of the assigned domain identifier; and means for displaying at least one of the activities, the resource, and the dependence relationship as a figure element.

The domain identifier is provided for identifying the domain or the viewpoint and can be called in various manners. In specific examples described later, the domain identifier is called "epistemological ground ID."

Also in the configuration, the activity, resource, and dependence relationship of the target process can be described for each viewpoint of process analysis or domain of the target process (epistemological ground) and the constraints, etc., of the domain are defined, whereby analysis appropriate for the domain can be made. It is also made possible to again use knowledge of processes belonging to different epistemological grounds by classifying the processes based on the activity, the resource, and the dependence relationship across fields.

The invention can be embodied in various information processing system such as a stand-alone computer system, a server client system, and a general-purpose computer system and can also be embodied not only as an apparatus or a system, but also as a method. At least a part of the invention can be formed as a computer program, of course. A computer program product (record medium) used for causing a computer to execute at least a part of the invention is also contained in the technical scope of the invention, needless to say.

BRIEF DESCRIPTION OF THE DRAWINGS

FIGS. 8A and 8B are drawings to describe the contents of dependence relationship;

FIG. 15 is a drawing to describe classification structures;

FIG. 16 is a drawing to describe classification structures concerning history information;

FIG. 17 is a drawing to describe classification structures concerning process patterns;

FIGS. 19A and 19B are drawings to show the data structures of the components as a whole;

FIGS. 20A and 20B are drawings to show specific data structure examples;

FIGS. 21A and 21B are drawings to show specific data structure examples;

FIGS. 22A and 22B are drawings to show specific data structure examples;

DETAILED DESCRIPTION OF PREFERRED EMBODIMENTS

The invention will be discussed in detail with reference to the acompanying drawings.

Process Description

In an embodiment of the invention, a process having "activity," "dependence relationship," "resource," and "epistemological ground" as four components is described. That is, the target in the real world to be described as a process is described as a model in which a plurality of activities operate having dependence relationship via resources rather than an object, and the course and the purpose of process description proper to the target domain are described in an epistemological ground as constraints in description of the three components of activity, resource, and dependence relationship. The dependence relationship is described based on the resources handled between the activities.

Figure 1:
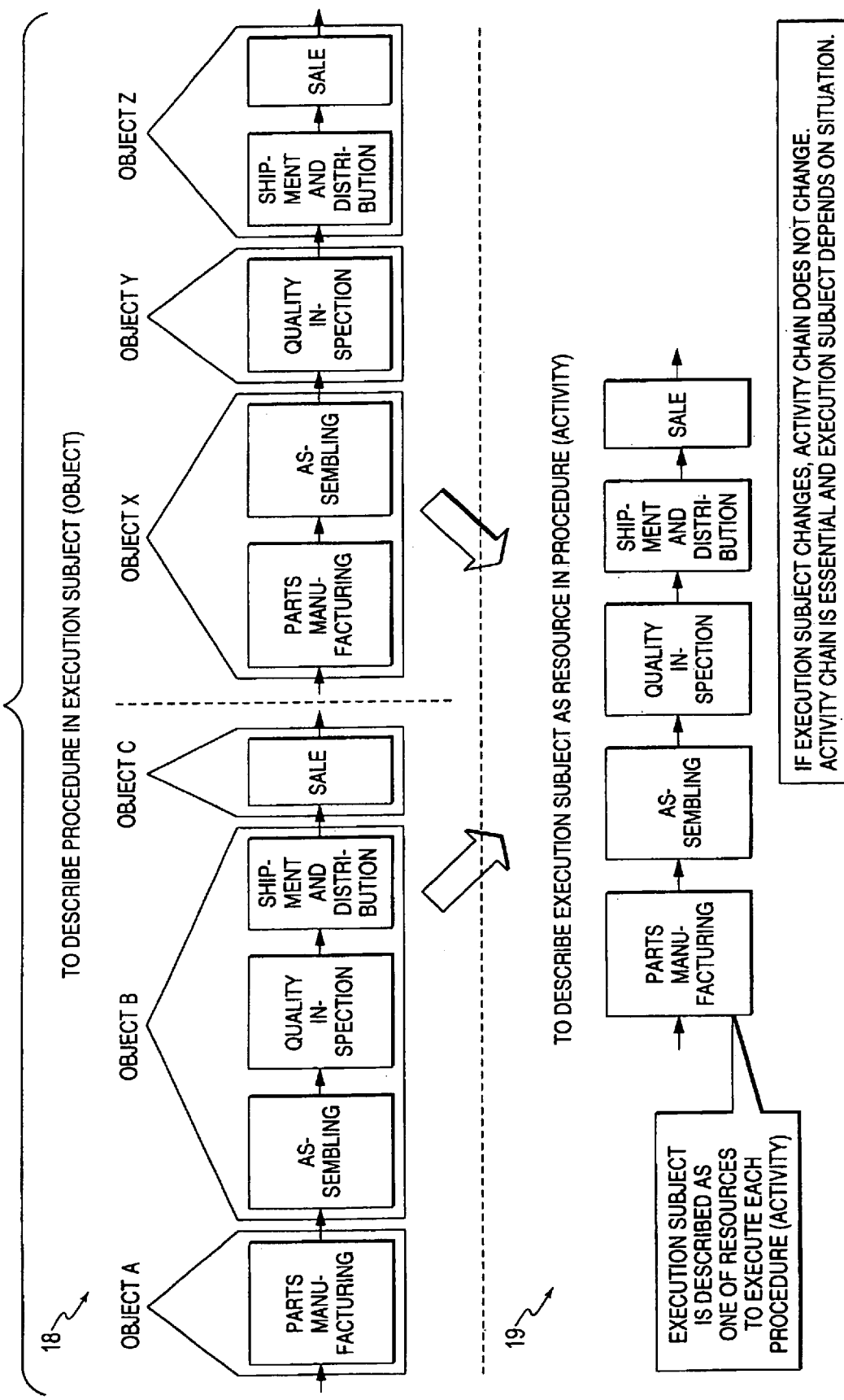
FIG. 1 is a drawing to describe the difference between object-oriented analysis and coordination theory analysis.
Figure 2:
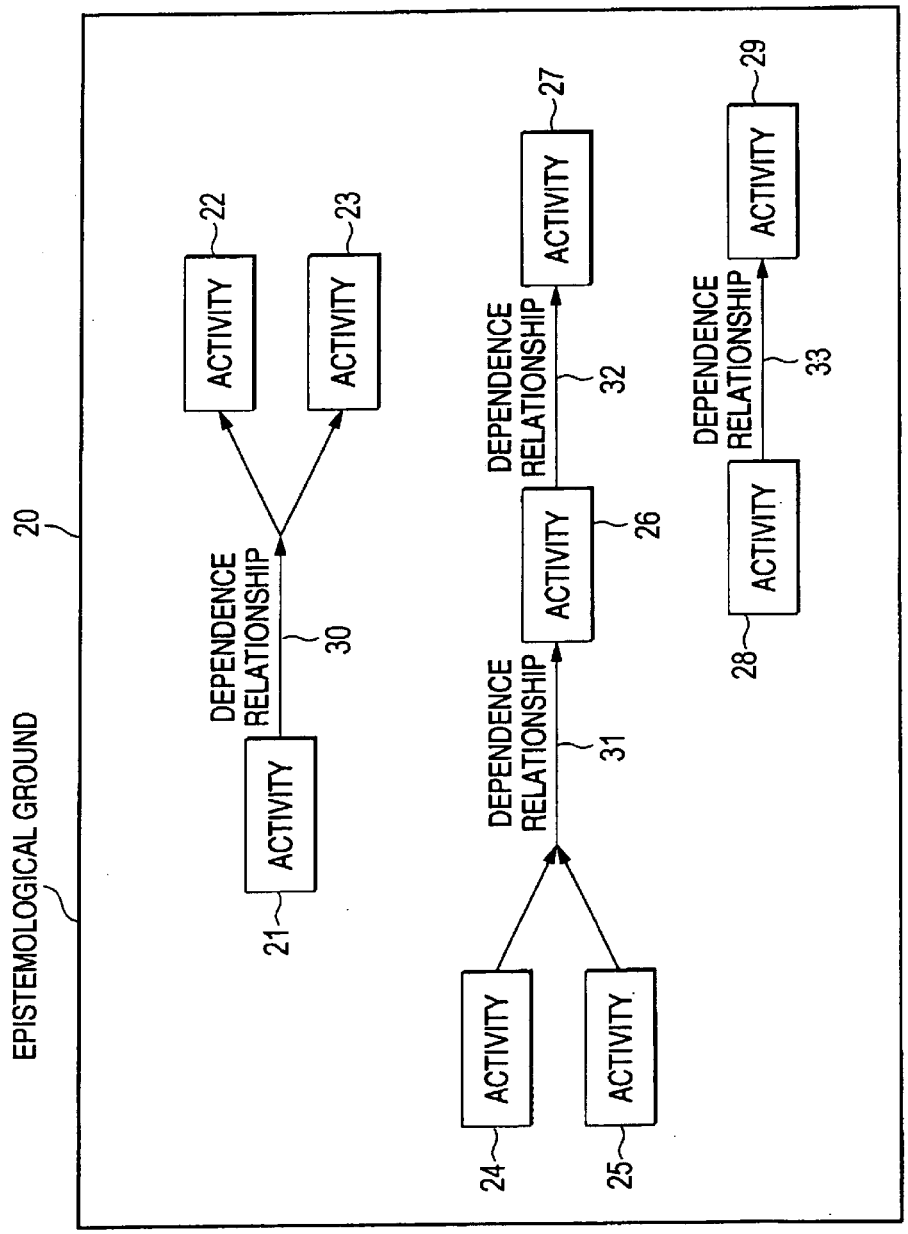
FIG. 2 is a drawing to describe basic model of process description of the invention.
Figure 3:
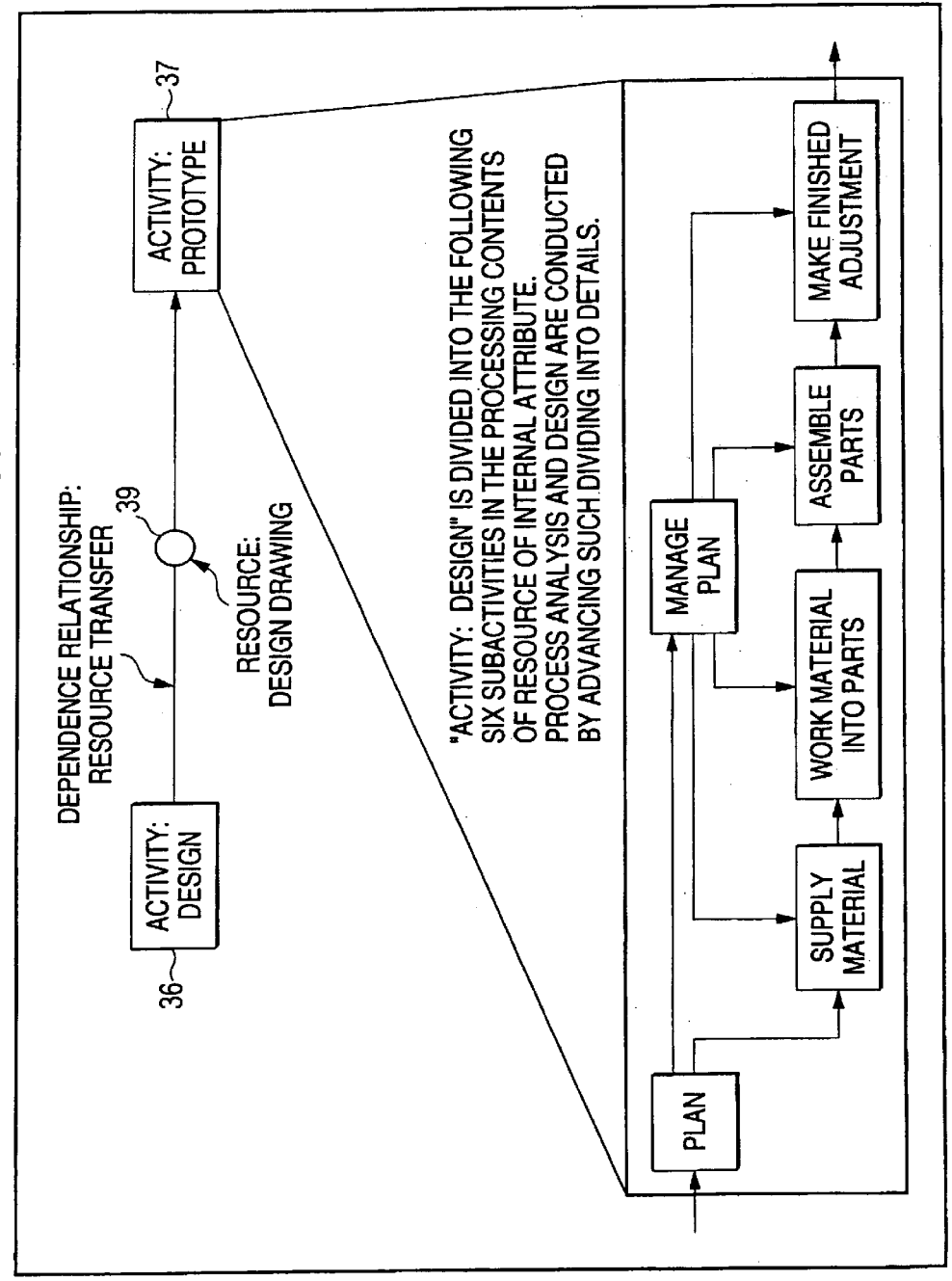
FIG. 3 is a drawing to show the basic model of the process description with a resource described.

The relationship of having activities 21–29 and the dependence relationship 30–33 between the activities 21–29 as the two components is represented by a model as shown in FIG. 2. The resource handled between the activities may be represented on the dependence relationship as in FIG. 3. In the example in FIG. 3, activity "design" 36 and activity "prototype" 37 are represented as the dependence relationship of "resource transfer" 38 type by transferring resource "design drawing" 39.

Figure 4:
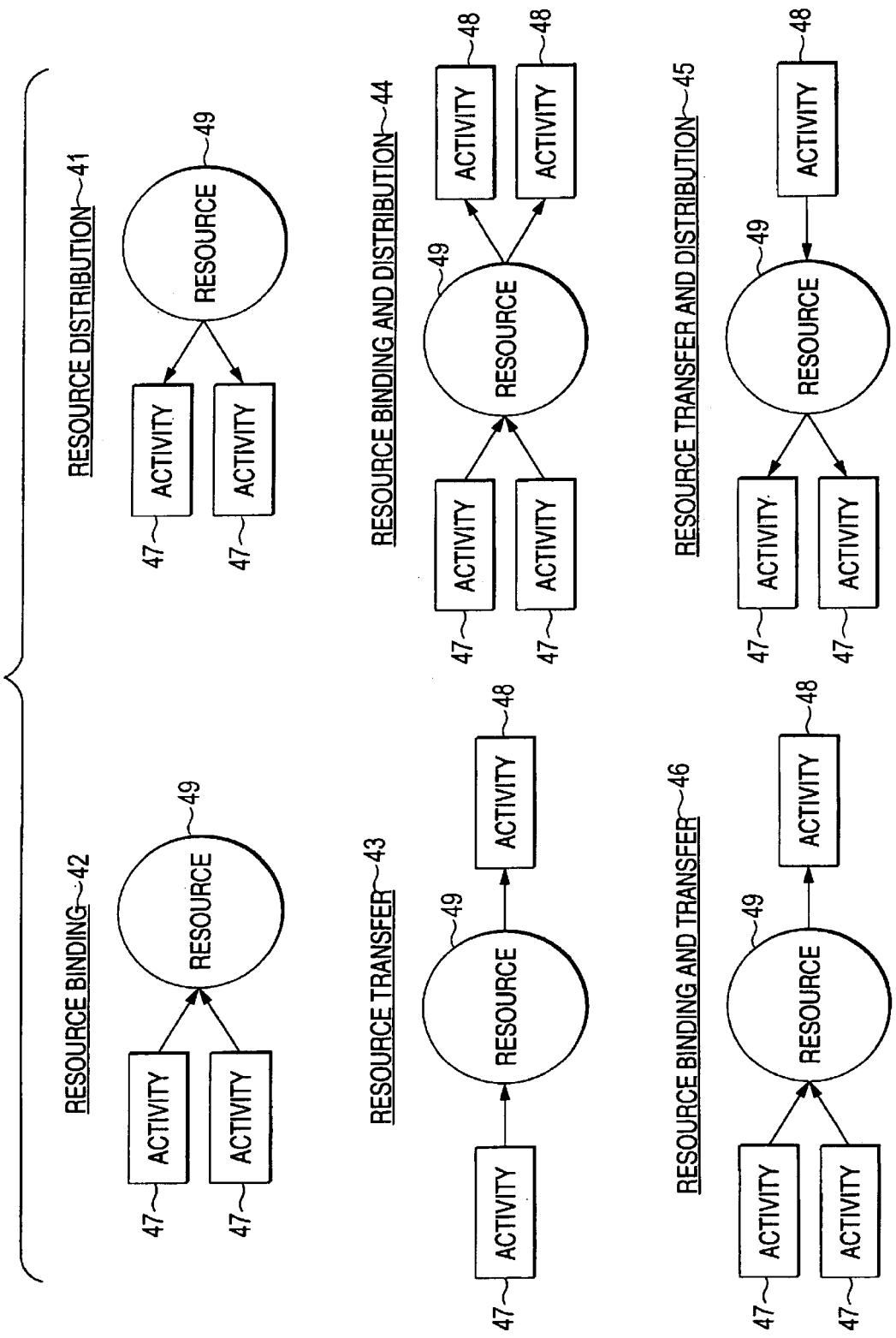
FIG. 4 is a drawing to describe six basic dependence relationships.

The six basic types of dependence relationship are resource distribution 41, resource binding 42, resource transfer 43, resource binding and distribution 44, resource transfer and distribution 45, and resource binding and transfer 46 in the combinational relationship between the activity 47 providing the resource 49 and the activity 48 using the resource 49, as shown in FIG. 4.

When a plurality of activities operate depending on each other via an arbitrary resource, from three X three combinations wherein the number of the activities providing the resource and the number of the activities using the resource are zero, one, and plural, the three combinations wherein the number of the activities becomes less than two are subtracted, and the six basic types result, covering all.

In Reference 11, the dependence relationship is represented by three basic types. For example, to attempt to represent the "resource binding and transfer" type in the invention by a combination of the three types, in the method in Reference 11, it must be represented by including the "resource binding" activities in the internal structure of the resource providing activity in "resource transfer." In this case, however, the direct dependence relationship between the resource providing activity and the resource using activities in the "resource binding and transfer" cannot be described, and the "resource binding" are merged into one of the resource providing activities in the "resource transfer," then the dependence relationship must be described.

As the six dependence relationship types, the situation in which two or more activities depend on each other is classified into types, but the dependence relationship of main and subordinate (which activity depends on which of other activities) is not limited. The reason is that a plurality of coordination methods different in relationship of main and subordinate exist as dependence relationship coordination method and to describe them so that they can be compared, it is convenient to describe in one dependence relationship type.

As examples of the coordination methods different in relationship of main and subordinate, if the consumption activity cannot be coordinated although the production activity can be coordinated, a coordination method of production based on orders is possible as a coordination method with the consumption as the main and the production as subordinate. In contrast, if the production activity cannot be coordinated although the consumption activity can be coordinated, a coordination method with the production as the main and the consumption as subordinate is adopted; an inventory coordination method and a price coordination method are possible.

As the resources, all things used or provided by an arbitrary activity can be set, such as matter, energy, information, time, space, raw material, facilities, human resources, and signal. However, in actual process description, the minimum necessary resources for describing the dependence relationship between activities and its coordination method are described, whereby a simple process description can be made. The definition concerning the minimum necessary description is described in resource definition in an epistemological ground.

For example, as the resources required for the activity of "printing a document," it is necessary to describe an electronic document and a printer as the resources in the an epistemological ground of information processing process design, but power supply and installation place need not be described as the resources. In contrast, in the epistemological ground of office layout design, it becomes indispensable to describe power supply and installation place as the resources.

The term "resource distribution" is used for representation of the dependence relationship between activities when a plurality of activities use one resource. For example, to print out on one printer from a plurality of personal computers, printouts from the personal computers must be coordinated to use the printer efficiently. The term "resource distribution" is used for representation of such dependence relationship.

The term "resource binding" is used for representation of the dependence relationship between activities when one resource is provided by a plurality of activities. For example, to complete one piece of music by playing a plurality of musical instruments, the play timing must be coordinated. The term "resource binding" is used for representation of such dependence relationship.

The term "resource transfer" is used for representation if the dependence relationship exists between activities when one resource provided by one activity is used by another activity. For example, the production activity and the sale activity have dependence relationship via the resource of products and various coordination methods can exist depending on the purposes of inventory minimizing, speeding up delivery at the maximum. The term "resource transfer" is used for representation of such dependence relationship.

The term "resource binding and distribution" is used for representation of the dependence relationship between a plurality of resource providing activities and a plurality of resource using activities when one resource is provided by a plurality of activities and further is distributed to a plurality of activities for use. For example, to assemble automobiles with the colors and types of parts changed in response to various user needs, the parts providing activity depends on orders from a plurality of car dealers, or one car dealer depends on others in the sense that the delivery time is affected by the production capability of the parts providing party and orders from other car dealers. The term "resource binding and distribution" is used for representation of such dependence relationship.

The term "resource transfer and distribution" is used for representation if the dependence relationship exists between activities when one resource provided by one activity is used by a plurality of activities. For example, in a system wherein the production amount and speed are changed depending on a plurality of demands, the resource providing party changes the amount of the provided resource and the providing speed of the resource depending on the number of activities to which the resource is distributed. The term "resource transfer and distribution" is used for representation of such dependence relationship.

In the example, if the amount of the provided resource or the providing speed of the resource is changed, it is assumed to be the same resource; however, the case where one resource is provided and the case where a dozen of resources are provided in a lot can also be assumed to be different resources by changing the resource definition in the epistemological round.

The term "resource binding and transfer" is used for representation if the dependence relationship exists between activities when one resource provided by a plurality of activities is used by one activity. For example, in a system wherein shipment adjustment is made depending on the activities of a plurality of suppliers, the resource use is controlled depending on a plurality of binding activities. The term "resource binding and transfer" is used for representation of such dependence relationship.

Figure 5:
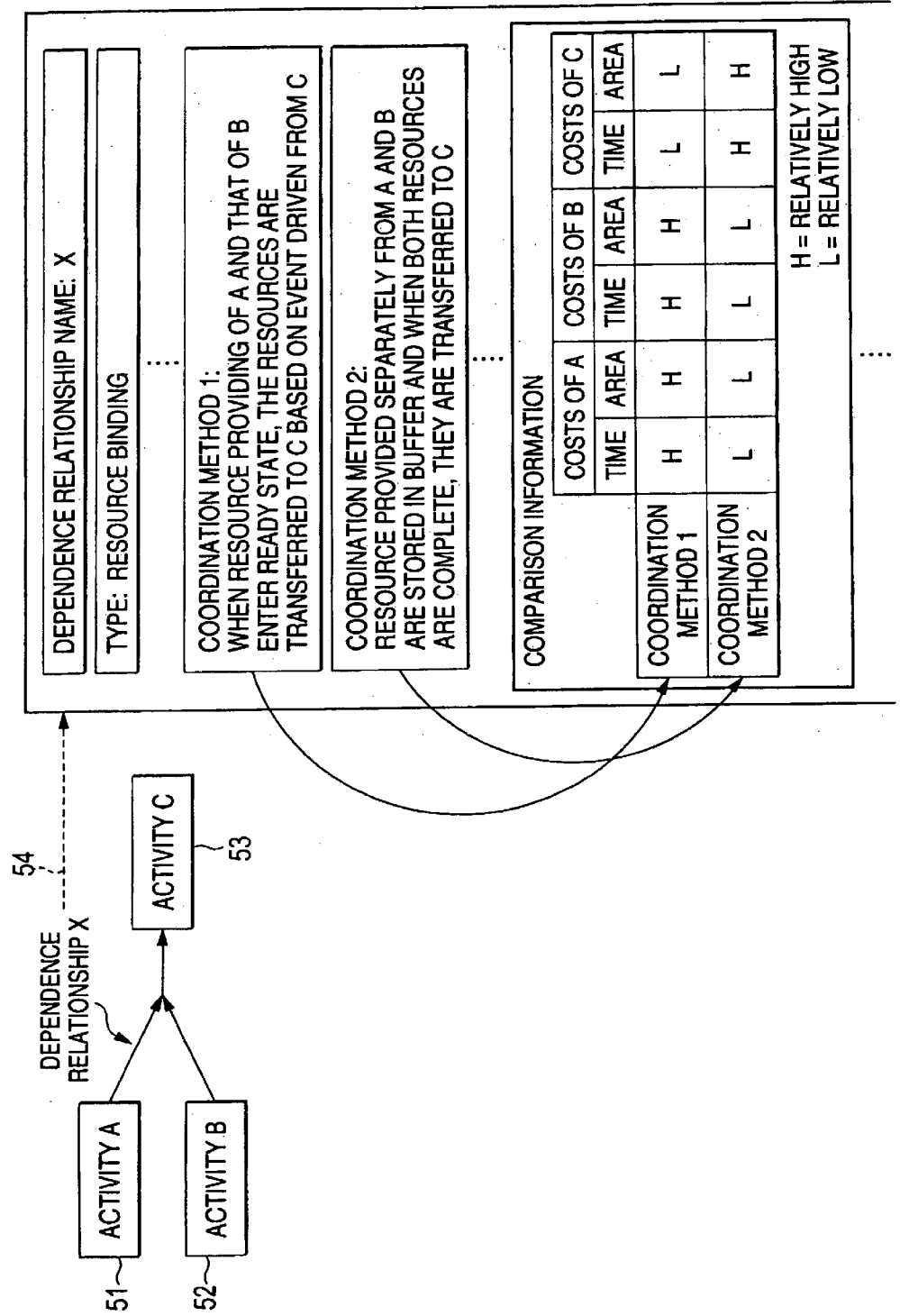
FIG. 5 a drawing to describe the concept of dependence relationship.

A coordination method of coordinating the dependence relationship between activities 51–53 is described as an attribute of the dependence relationship 54. The coordination method of coordinating the dependence relationship between activities is described as the contents of the dependence relationship, as shown in FIG. 5. In the case where no coordination method exists although the dependence relationship exists, no coordination method is described.

The epistemological ground is a component for describing the purpose and course of process description in a target domain (specialization field or technical area) in which the process to be described exists, and the contents including information concerning definition of the three components of activity, resource, and dependence relationship (described range, type definition, classification structure, and end condition of description containing granularity (range of dividing description into details)) are described.

Figure 6:
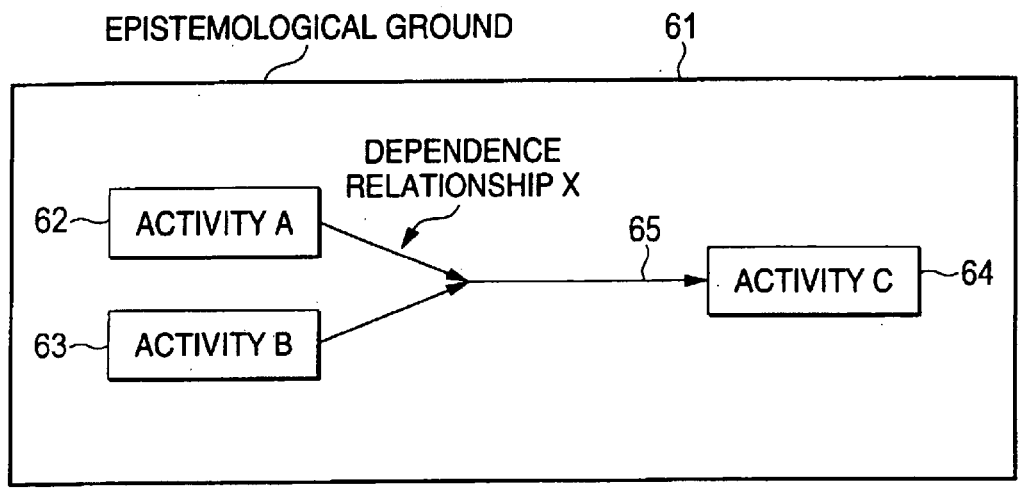
FIG. 6 a drawing to describe the concept of an epistemological ground.

As shown in FIG. 6, the epistemological ground 61 retains information for controlling description of the three components of activity 61–64, resource (not shown), and dependence relationship 65 as contents and exists as background information of process description.

Figure 7:
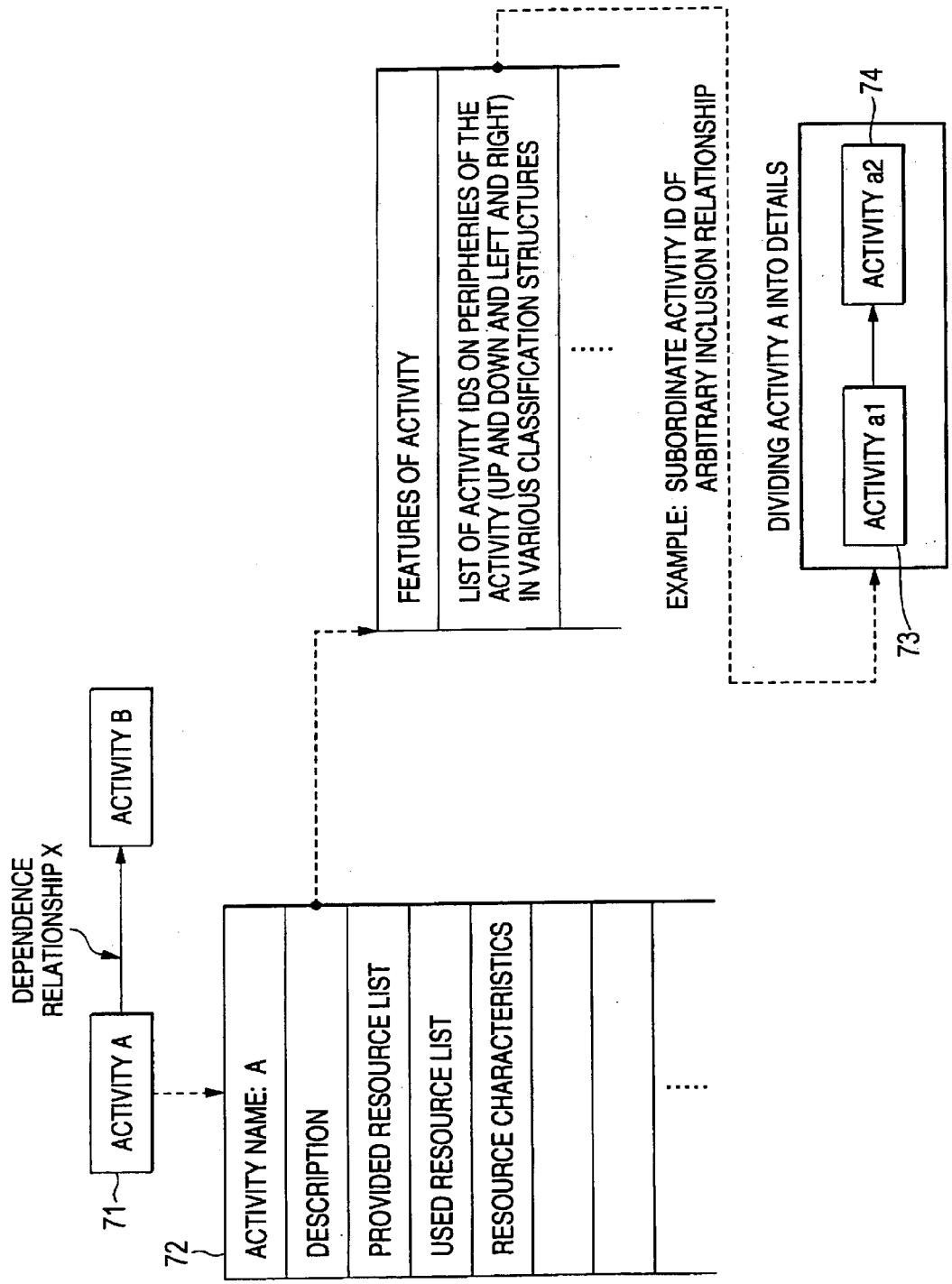
FIG. 7 is a drawing to describe the contents of an activity.

The activity is a component for describing the operation forming a process and the contents including the activity name, the resource involved in the activity, and the details of the activity are described. FIG. 7 shows the details of the activity 71. The details of the activity 72 mentioned here are also a process and the activity is divided into details by the process description method.

As the activity, the contents including the resources involved in the activity (used and provided resources) and the details of the activity are described, as shown in FIG. 7. If the details of the activity mentioned here can be described as a process, the activity is divided into details by the process description method. In the example in FIG. 7, to divide activity A into details 72, a process made up of activities a1 and a2 is shown.

The dependence relationship is a component for describing the relationship between activities and the contents including the dependence relationship between activities when attention is focused on the resource transferred between the activities, and the coordination method of coordinating the dependence relationship are described. If the coordination method mentioned here can be described as a process, it is described by the process description method.

In the dependence relationship, if more than one coordination method exists, the contents including information concerning comparison of the coordination methods are described.

As the dependence relationship, the contents including the resource transferred between activities and the activities depending on each other and coordination method and coordination method comparison information as the contents of the dependence relationship. In the example in FIGS. 8A and 8B, for the activities 81, 82, the resource providing activity and the resource using activity are retained separately (FIG. 8A). In the example in FIGS. 8A and 8B, two coordination methods exist and information concerning comparison of the coordination methods 85 is described (FIG. 8B). The information concerning comparison is represented by a description made in a natural language, a balance sheet, or a tradeoff table. If the coordination method can be described as a process, activities C 86 and D 87 references the process described by the process description method as in the example in FIG. 8B.

The resource is a component for describing the resource transferred between activities and the contents including the resource name and the nature of the resource are described.

Figure 9:
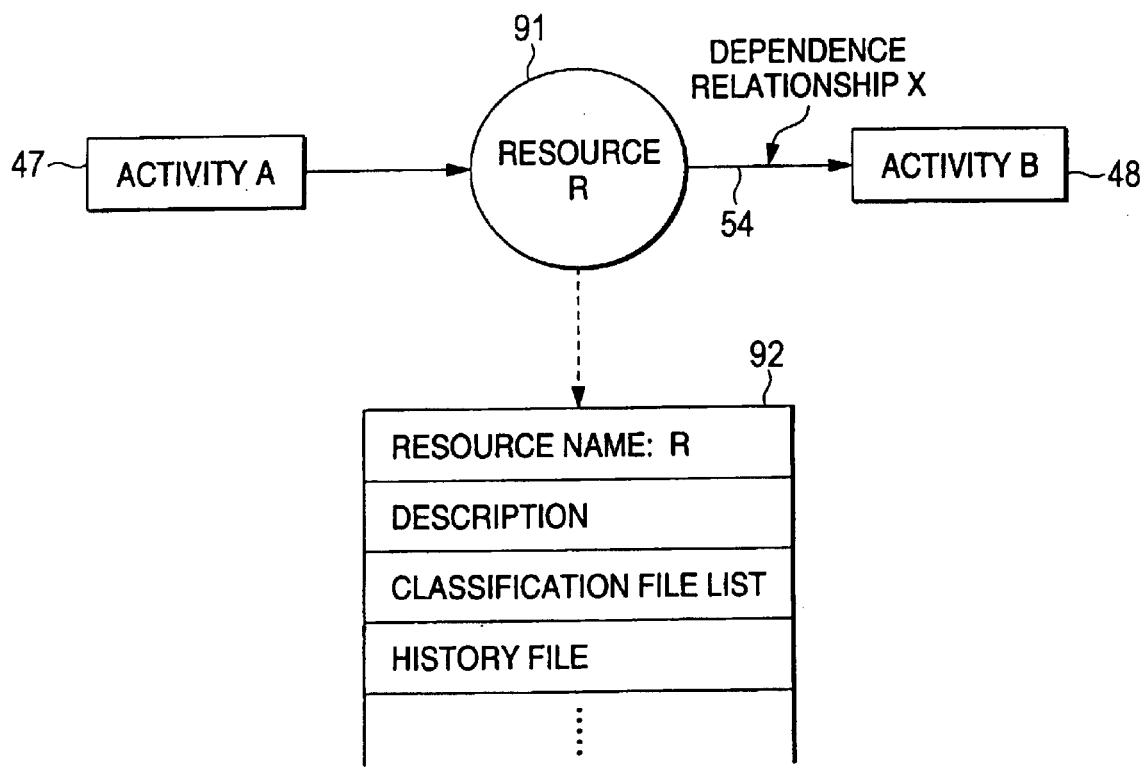
FIG. 9 is a drawing to describe the contents of a resource.

The resource 91 is described by the contents 92 including the resource name and the nature of the resource, as shown in FIG. 9. The nature of the resource is defined using an epistemological ground. For example, to adopt a worker as the nature of the resource, the values corresponding to the attributes of work qualification, age, work hours, past work experience, etc., are entered in the nature of the resource. The attributes are defined in the epistemological ground.

Figure 10:
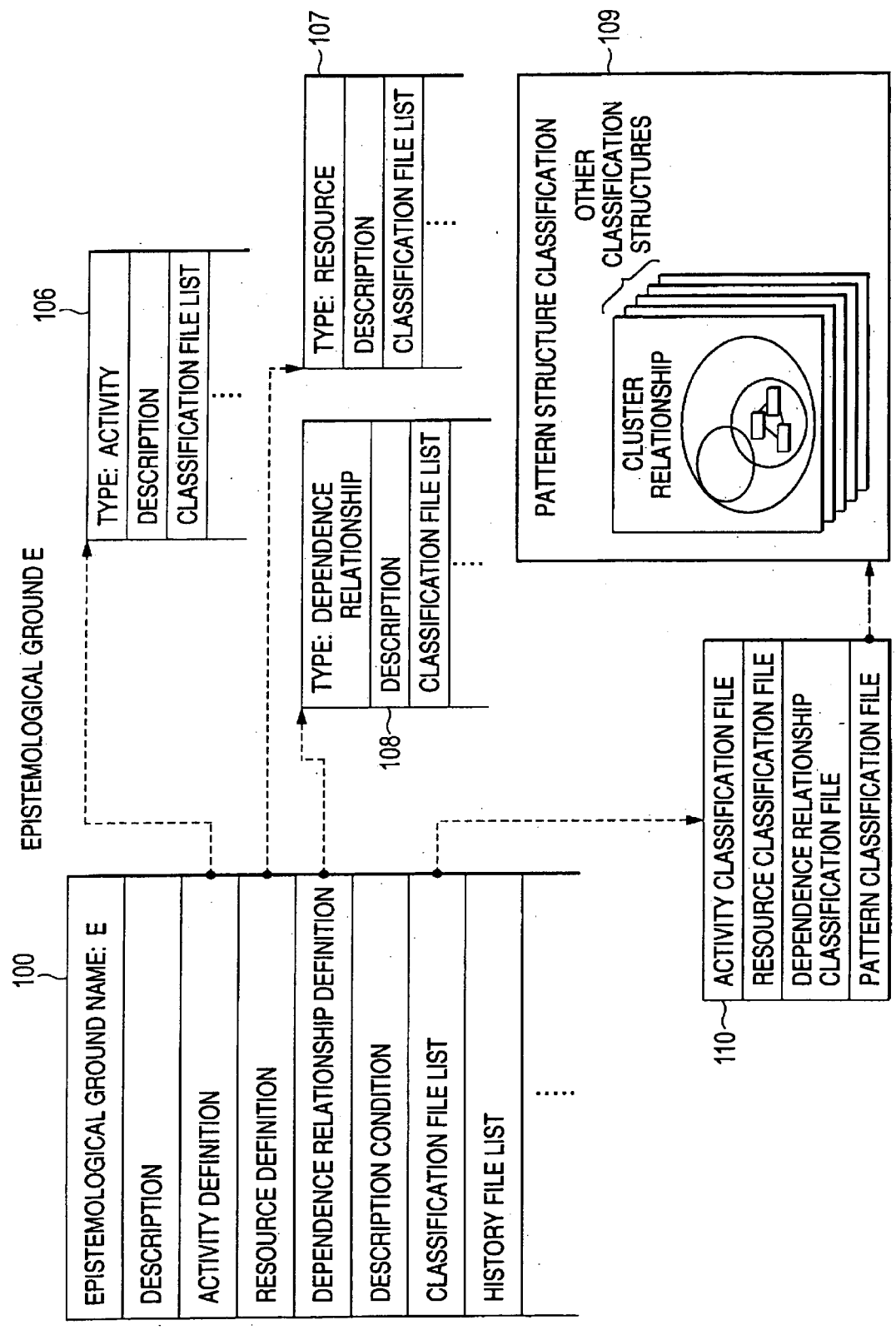
FIG. 10 is a drawing to describe the contents of an epistemological ground.

The epistemological ground defines characteristics depending on the domain to describe the process to be described as a model closer to the actual needs by describing information concerning the nature of the target domain wherein the process to be described exists, and the analysis viewpoint and purpose. As shown in FIG. 10, the contents including information concerning the activity 106, the resource 107, and the dependence relationship 108 description ranges (type and granularity), type definition for determining the. attribute to describe the component nature, the classification structure 110 in which the components are mapped, and the description end condition for dividing the process into details 109 are described. The values vary depending on the target domain and some values are displayed in format theory or expression and some are described in a natural language as description.

From the practical demand, a single global epistemological ground independent of the target domain exists, and definition of the activity, the resource, and the dependence relationship as initial values independent of the target domain is described as attributes of the global epistemological ground. To create a new epistemological ground, additional description specialized for the target domain is made for the global epistemological ground and an epistemological ground name to the target domain as a different name from the name of the global epistemological ground is given and the new epistemological ground is saved.

Process Classification

In the embodiment, processes are classified with activity, dependence relationship, resource, and epistemological ground as four components. The three components of the activity, the resource, and the dependence relationship can be classified according to various classification structures including meaningful abstract and concrete (Is-a) relationship like generalization-specialization, inclusion (Part-of) relationship indicating composition like whole-part, cluster relationship indicating traditional or intuitive classification proper to each field, etc., and the classification structures are managed as attributes of the epistemological ground using each component.

Figure 14A:
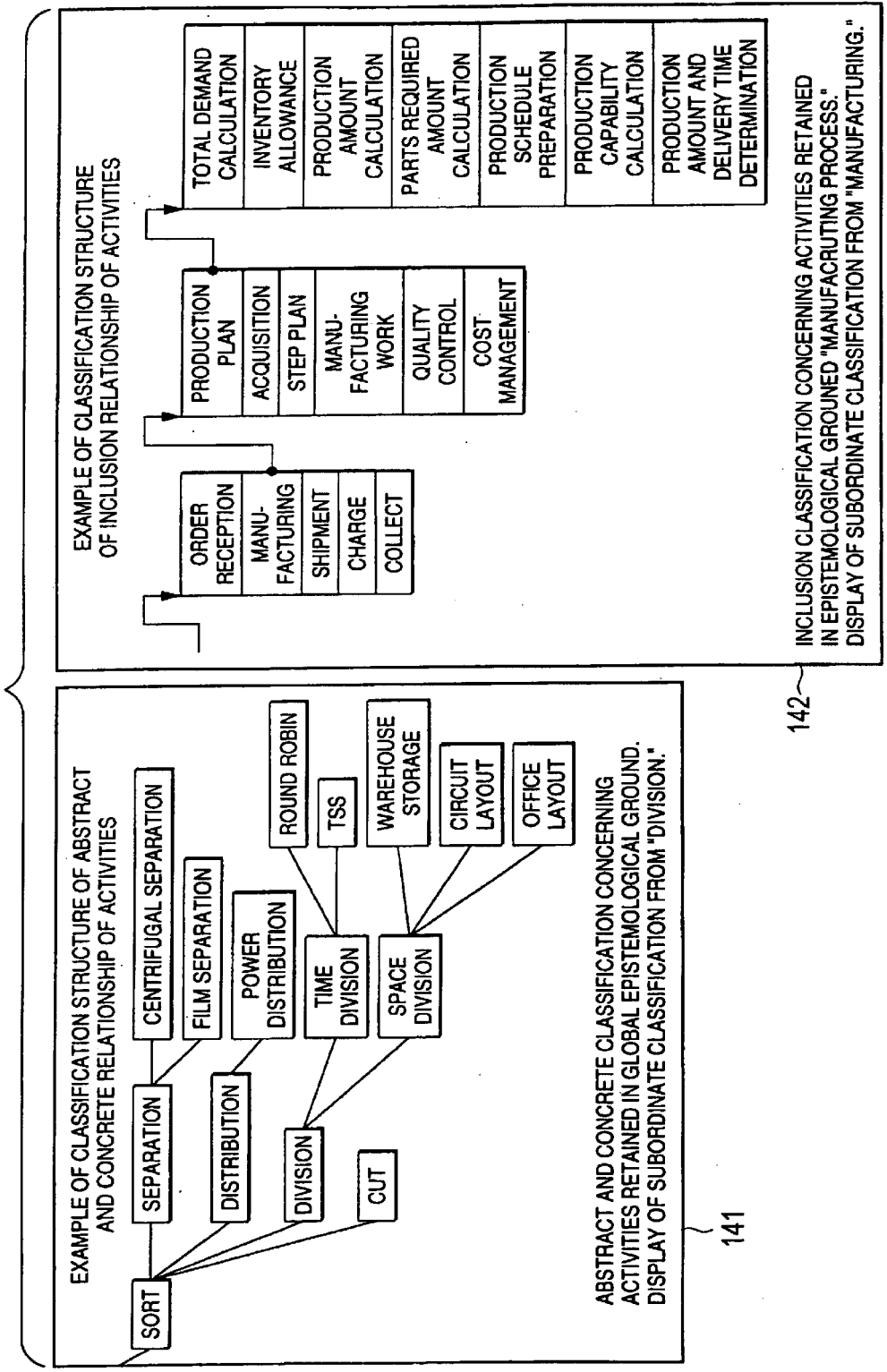
FIGS. 14A and 14B are drawings to describe classification structures concerning activities, dependence relationships, etc.
Figure 14B:
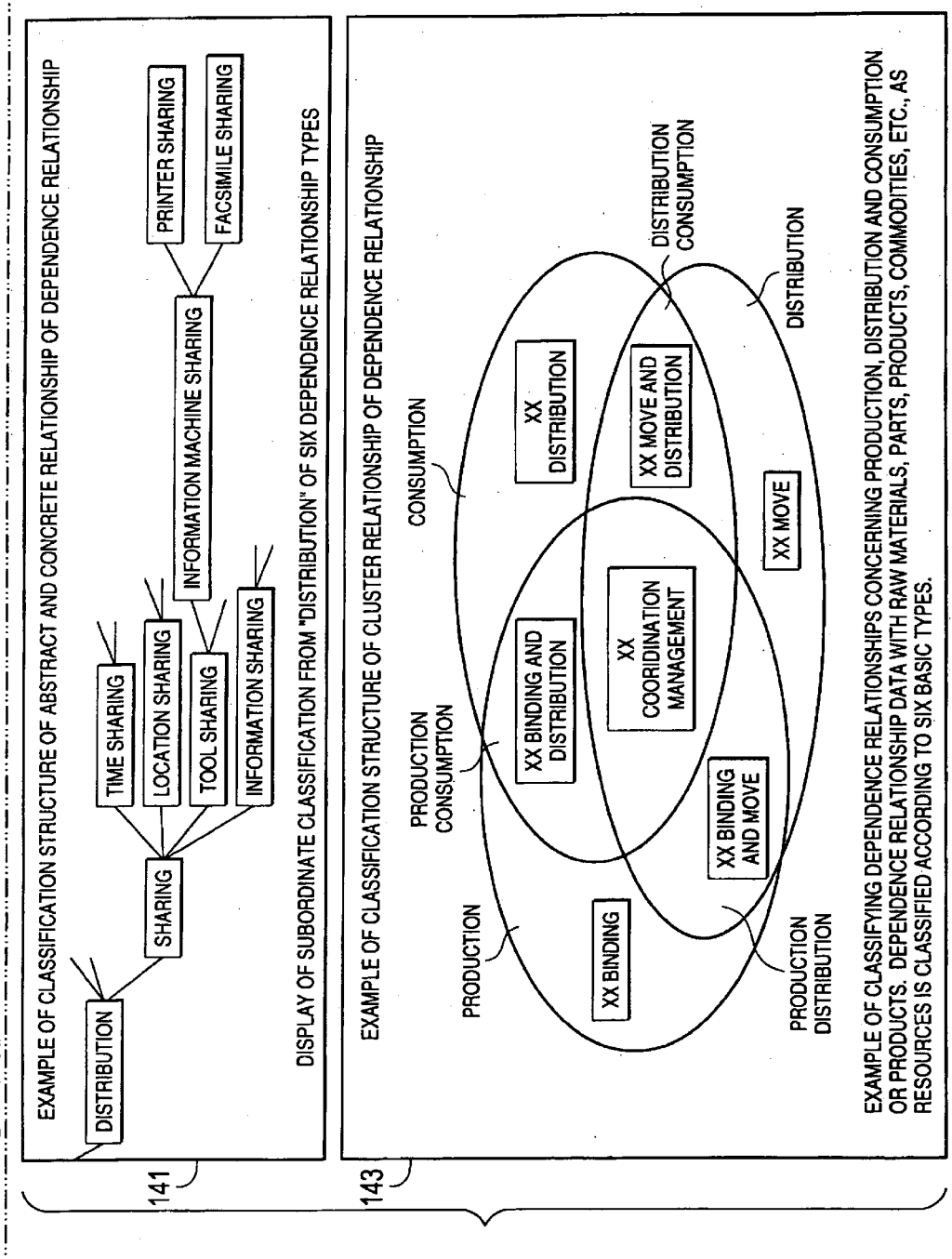

The dependence relationships of activities and resources are classified according to various classification structures including meaningful abstract and concrete (Is-a) relationship 141, inclusion (Part-of) relationship 142 indicating composition, in FIG. 14A, and cluster relationship proper to each field 143, etc., as shown in FIG. 14B as an example. FIG. 15 shows examples of classification of resources 151. More than one classification structure can be defined for each epistemological ground and from the practical demand, a single global epistemological ground 181 exists as shown in FIG. 18 and global classification structure 182 is retained in the global epistemological ground. single global epistemological ground 181 exists as shown in FIG. 18 and global classification structure 182 is retained in the global epistemological ground.

The epistemological grounds can also be classified according to various classification structures including meaningful abstract and concrete (Is-a) relationship, inclusion (Part-of) relationship indicating composition, cluster relationship proper to each field, etc., and the classification structures are managed as attributes of the global epistemological ground.

Figure 18:
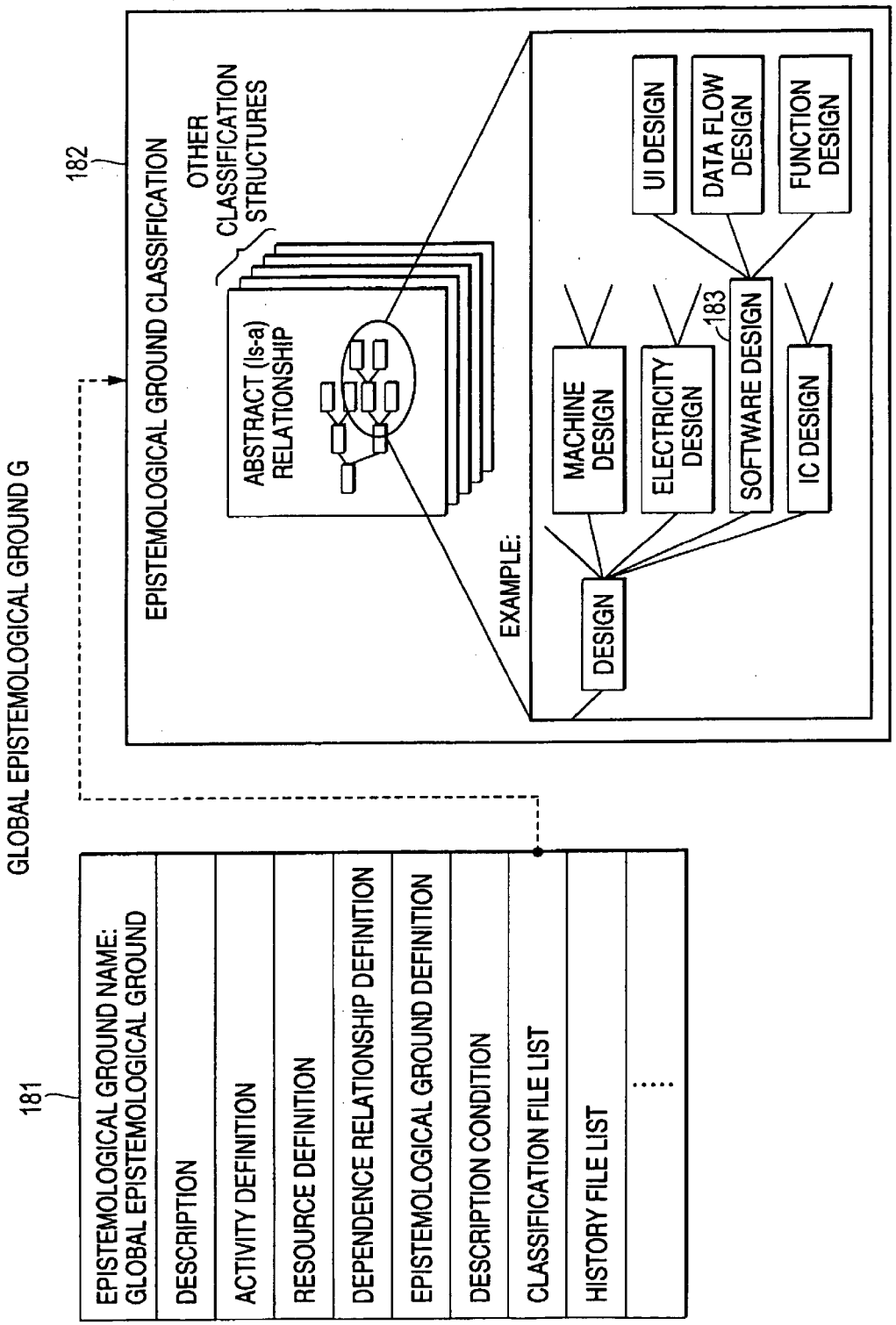
FIG. 18 is a drawing to describe classification structures concerning epistemological grounds and a global epistemological ground.

That is, the epistemological grounds are classified according to various classification structures including meaningful abstract and concrete (Is-a) relationship, inclusion (Part-of) relationship indicating composition, cluster relationship proper to each field, etc., as shown in FIG. 18. The classification structures of the epistemological grounds are retained only in the global epistemological ground.

The four components of the activity, the dependence relationship, the resource, and the epistemological ground are classified according to various classification structures including history information of creation histories, change histories, reference histories, deletion histories, etc., and the classification structures are managed as attributes of the epistemological ground using each component.

Various pieces of history information of creation histories, change histories, reference histories, deletion histories, etc., are retained for each component, as shown in FIG. 16.

Characteristic processes used in specific patterns, such as those frequently used or the well-worn means most frequently used under a specific condition, are classified according to various classification structures including the cluster relationship as process patterns, and the classification structures are managed as attributes of the epistemological ground using each components.

As shown in FIG. 17, the process patterns are classified according to various classification structures 171–174 including the cluster relationship overlapped 175 and more than one classification structure can be defined for each epistemological ground and from the practical demand, global classification structure is retained in the global epistemological ground.

Process Knowledge Database

Figure 13:
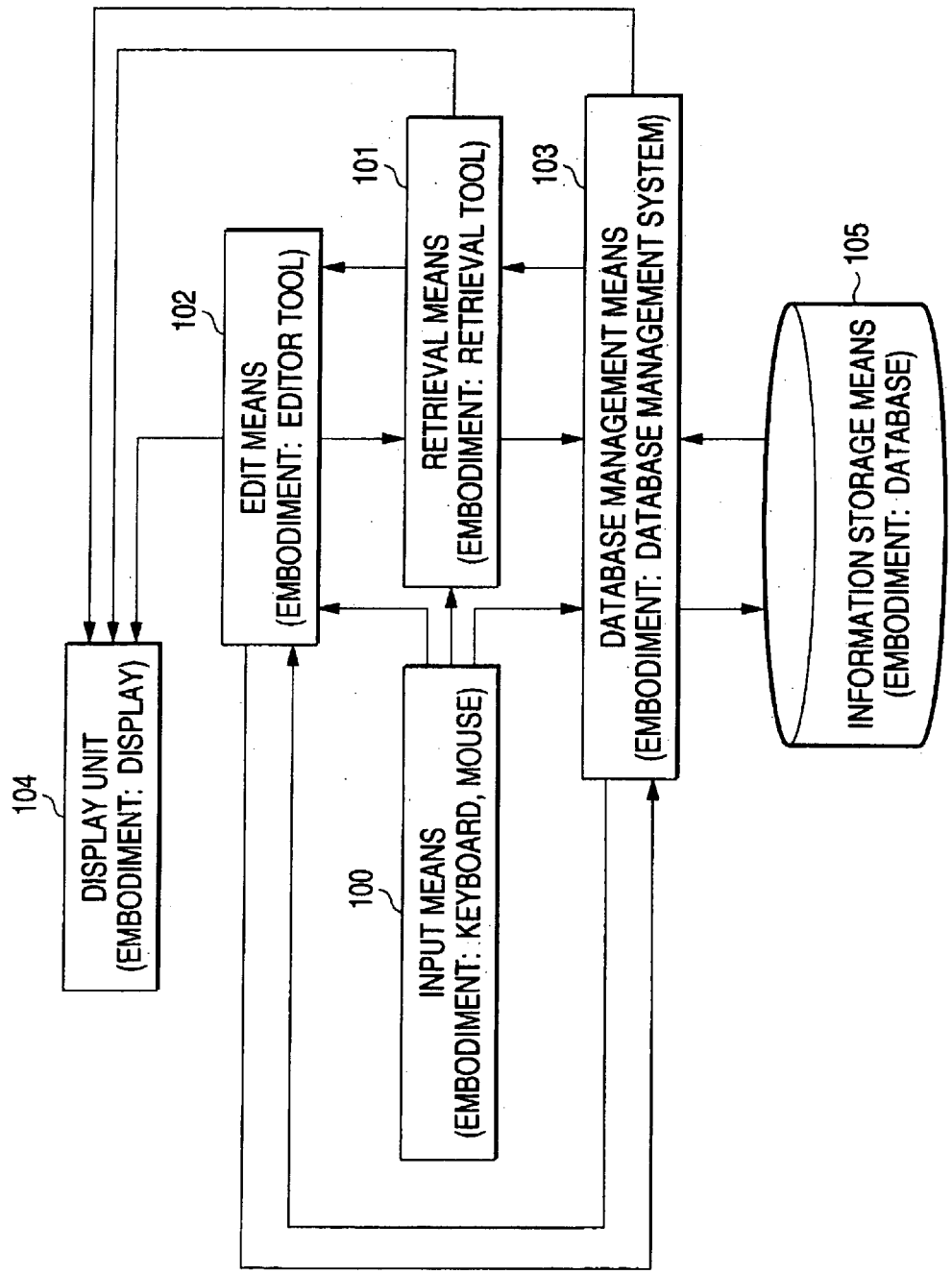
FIG. 13 is a drawing to show a process knowledge database system.

In the embodiment, a process knowledge database installing the process description method and the process classification method as described above is realized. The process knowledge database can be installed in various computer systems such as a client server system, a general-purpose system, and a stand-alone computer system. That is, the database system-classifies the process description data based on the above-described components according to the above-described classification structures and retains the process description data. Further, the process knowledge database is made up of input means 100, retrieval means 101, edit means 102, database management means 103, display means 104, and storage means 105, as shown in FIG. 13.

Process Retrieval Method

In the embodiment, for example, using the above-described process knowledge database system, specific information, similar information, peripheral information, target information, and the like are retrieved from the above-mentioned various classification structures with the types, values, or their combinations contained in the attribute information of activity, dependence relationship, resource, and epistemological ground as retrieval keys.

That is, the process retrieval method is so-called attribute retrieval for retrieving information according to combinations of the types and values of the attributes of the components, and specific information, similar information, peripheral information, target information, and the like are retrieved from the above-mentioned various classification structures with the types, values, or their combinations contained in the attribute information of activity, dependence relationship, resource, and epistemological ground as retrieval keys.

In a system or a database incorporating the process description method described above, specific information satisfying a condition, similar information matching if the retrieval information is a little loosened, peripheral information whose nearby information is retrieved in classification structure depending on an epistemological ground, information of comparison target compared in the coordination method comparison information in FIGS. 8A and 8B when dependence relationship is described, and the like can be retrieved with information contained in the attribute information of activity, dependence relationship, resource, and epistemological ground or their combinations as retrieval keys, as described below.

To retrieve specific information with a retrieval condition specified, which of activity, dependence relationship, resource, and epistemological ground is to be found the retrieval result of is specified. If necessary, retrieval can also be executed with the attribute value of the retrieval target and the value specified and flexible retrieval can be executed by specifying any other information of relevant activity, dependence relationship, resource, and epistemological ground or the attribute.

First, epistemological ground retrieval will be discussed. To retrieve an epistemological ground, epistemological ground retrieval is specified and its conditions are set. As the conditions, not only the attribute values of the epistemological ground, such as end condition and name, but also the activity, dependence relationship, resource contained in the epistemological ground can be used to retrieve the epistemological ground. For example, the epistemological ground containing the activity having a specific attribute value is retrieved. Further, retrieval with the retrieval range specified in classification structure in such a manner that the retrieval range is set in the direction of the superordinate hierarchy on the classification structure of global epistemological ground with a specific epistemological ground or its set as a viewpoint, that the retrieval range is set at the same level, or that retrieval range is set in the direction of the subordinate hierarchy. Similar retrieval with the allowable range loosened for condition match can also be executed.

Similar retrieval is also provided for the activity, the dependence relationship, and resource. Which of the activity, dependence relationship, and resource is to be found the retrieval result of is specified and retrieval is executed. If necessary, retrieval can also be executed with the attribute value of the retrieval target and the value specified and retrieval can be executed by specifying any other information of relevant activity, dependence relationship, resource, etc., or the attribute. At the time, to specify the condition of the activity, dependence relationship, or resource, the condition of the epistemological ground can also be specified. If no specification is made, retrieval is executed in all epistemological grounds; if specification is made, retrieval is executed using the attribute values and classification structure of the activity, dependence relationship, resource in the epistemological ground of the specific condition.

The retrieval range can also be specified for the activity, dependence relationship, resource. The epistemological ground and the classification structure in the epistemological ground are specified, whereby the retrieval range can be controlled in the classification structure. For example, if the retrieval range is defined in the direction of the superordinate hierarchy for one activity, the retrieval range is specified in the range following the classification structures described about the described activity, of the classification structures that the specified epistemological ground has in the direction of the superordinate hierarchy. As similar retrieval range control, the retrieval range can be defined in the direction of the subordinate hierarchy, in the sane-level hierarchy, in the periphery in the classification structure, etc.

As special retrieval, for coordination methods contained in dependence relationships, another coordination method within the same dependence relationship can also be retrieved. The coordination method retrieval can also be logically bound with other retrieval conditions described above. For example, control of specifying a relevant activity condition and specifying the retrieval range can be added.

In the example in the related art, the abstract and concrete form directions differ between fields wherein classification structure priorities differ in different fields and if abstracting is advanced in each classification structure, a common portion cannot be seen in some cases. In the invention, however, more than one classification structure is allowed in an epistemological ground, whereby it is made possible to provide a common classification structure even between fields wherein classification structure priorities differ. Such a common classification structure is specified and the retrieval range is specified, whereby it is made possible to find out a process match, etc., between fields formerly unable to be detected and in addition, retrieval with the classification structure specified can be executed, so that retrieval range specification in the viewpoint at the retrieval time can be realized without being affected by classification structure priorities differing between fields.

Process Analysis Method

Analysis is conducted while epistemological ground definition and process description are made in parallel. First, the above-described epistemological ground is defined, a process is analyzed and described according to the above-described activity, dependence relationship, and resource based on the epistemological ground definition, and the epistemological ground definition is improved as required based on information provided from the analysis. The process analysis and description and improvement in the epistemological ground definition are repeated for advancing the process analysis until the description end condition defined in the epistemological ground is reached.

Figure 11:
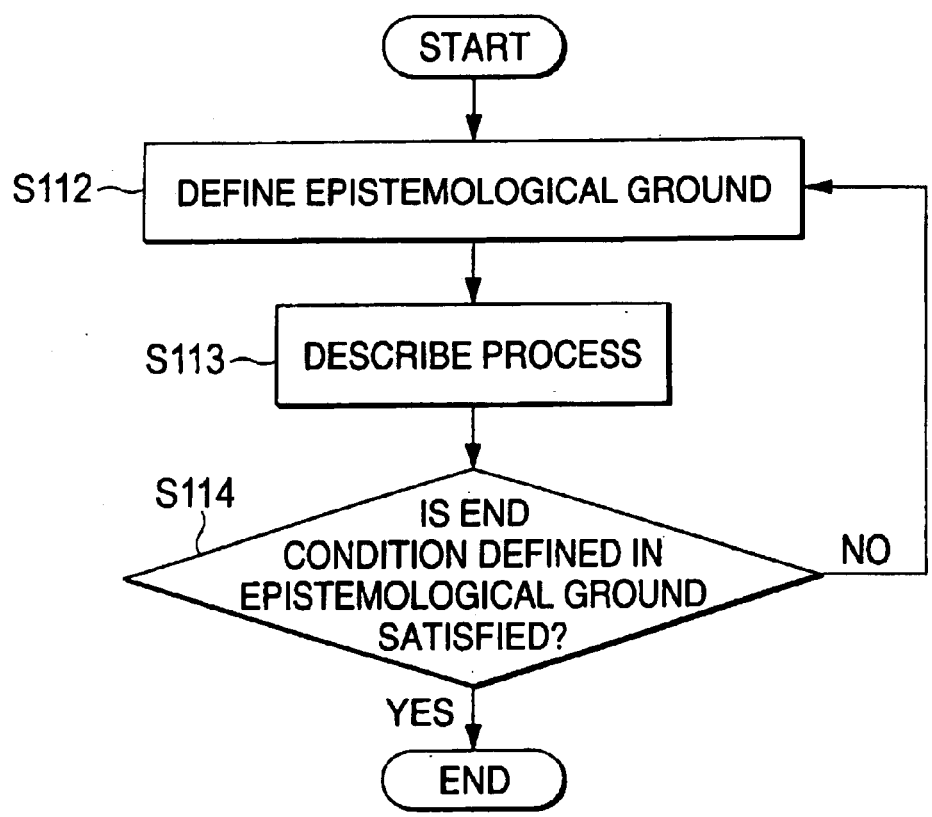
FIG. 11 is a basic flowchart of a process analysis method.

The process analysis method is an analysis method of making epistemological ground definition and process description in parallel, as shown in FIG. 11. The steps shown in FIG. 11 are obvious from the figure and therefore will not be discussed.

Figure 12:
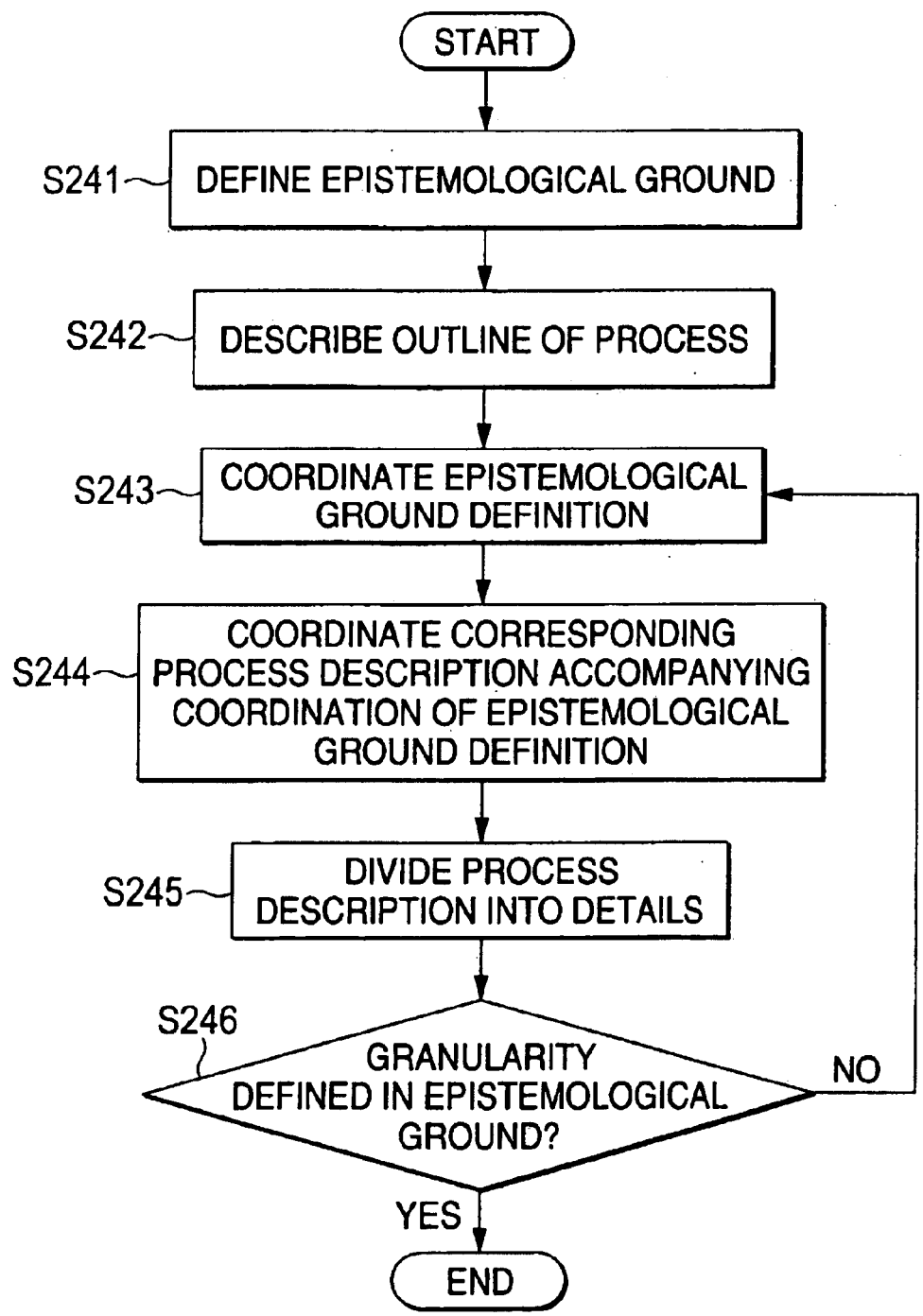
FIG. 12 is a flowchart of an example of the process analysis method.

Specifically, as shown in FIG. 12, an epistemological ground is defined S112 for the purposes of describing the characteristic of the target domain wherein a process exists and the process, etc. To define an epistemological ground, a new epistemological ground is created based on a global epistemological ground provided as initial value or an epistemological ground matching or similar to one of the already described and classified epistemological grounds is used or improved.

Next, based on the defined epistemological ground, the process to be analyzed is analyzed and described S113 paying attention to activity, dependence relationship between activities, and resource. If process description similar to the target process is retrieved and found, the found process description is used and improved and description of the target process is advanced. At the initial stage, the process is described with the granularity and abstract degree capable of surveying the whole image.

Next, the epistemological ground definition is again checked based on the information provided in the process of the analysis, and addition or correction is made as required. If the epistemological ground definition is changed, the process description is also corrected accordingly.

Last, collation is made with the description end condition defined in the epistemological ground and if a match is found, the processing is terminated S114. If no match is found, again control returns to checking the epistemological ground definition and the steps are repeated.

The steps shown in FIG. 12 are also obvious from the figure and therefore will not be discussed in detail.

If the epistemological ground concerning the target domain of the process to be analyzed already exists, the history information of the analysis conducted in the past with the epistemological ground is used and the process is described while the process description constraints defined in the epistemological ground (component definition, etc.,) are changed gradually, whereby the process analysis can also be advanced.

With the analysis method, if the epistemological ground corresponding to the target domain of the process to be analyzed already exists, the process is described while the epistemological ground is changed gradually based on the history of the analysis conducted in the past with the epistemological ground, whereby coordination of analysis detail degree and granularity can be supported using the past analysis history.

If the epistemological ground concerning the process to be analyzed already exists, the history of change of the epistemological ground made in the past is edited as required and the gradual change of the epistemological ground is retained in the epistemological ground history as methodology of process analysis. To analyze the target process, the process is analyzed and described following the gradual change of the epistemological ground, whereby the process analysis is advanced.

To analyze and describe the process following the gradual change of the epistemological ground, the step of change of the epistemological ground (=analysis step) is recorded in an edited history file. The history file for analysis is retained as one history file in the history file list of the epistemological ground, for example, with history file name "analysis guide 1" or the like.

To gradually change the epistemological ground using the history file like "analysis guide 1," arbitrary data in the history referenced from the history file "analysis guide 1" is referenced, whereby the state of the epistemological ground retained as a record in the history data is adapted to various definitions and description conditions of the current epistemological ground. At this time, the most recent state of the epistemological ground is backed up in a normal history file, for example, with history file name "automatic history."

Normally, the history items indicating the analysis steps are placed in order in the analysis file with the steps. To specify the epistemological ground used for analysis by referencing epistemological ground classification structure, the criterion for advancing analysis from one analysis step in the history file for analysis to the next analysis step, or the criterion for branching analysis to a different analysis step or making a loop or jumping to analysis using the epistemological ground of a domain different from the current depending on the analysis result at one analysis step, they are described in the description portion in the analysis file.

For example, as shown in an epistemological ground classification example in FIG. 18, in the process of advancing the analysis step in epistemological ground "software design," 183 the analysis is branched to epistemological ground "UI (user interface) design," epistemological ground "data flow design," or epistemological ground "function design" and can be advanced while using an appropriate epistemological ground in keeping with the advance of the analysis.

In the process analysis method described here, the history of change of the epistemological ground made in the past is edited as required and the gradual change of the epistemological ground is retained in the epistemological ground history as process analysis steps and when the target process is analyzed, the process is analyzed and described following the gradual change of the epistemological ground.

Since the epistemological ground history is a history in the process of embodying the process description constraints after trial and error, analysis steps for efficiently analyzing with the process description constraints changed gradually can be prepared by editing the history. Using such analysis steps, support can be executed, for example, in such a manner that the constraints are loosened at the initial stage of process analysis for facilitating description of the whole and are tightened gradually for the detailed description accuracy of the parts, thereby eliminating missing parts.

Process Design Method

Information of a similar process description to the whole or part of the process to be designed is retrieved by the above-described retrieval method and the found process model is corrected or expanded, whereby a new process can be designed.

The process design method aids in designing a new process by retrieving a replaceable process description or a similar process description to the whole or part of the process to be designed by the above-described retrieval method and improving the found process description. To execute retrieval, a plurality of epistemological grounds are retrieved or a global epistemological ground is retrieved, whereby information concerning processing description from areas across fields and domains can be provided.

Process Display Method

In a process display method, the background area including an expanded E-R model characterized in that E (entity) and R (relationship) of an E-R model are related to activity and dependence relationship respectively and that a polynomial link of n to m is allowed in R and a model represented by the expanded E-R model can be represented in a background color or by area contour lines as an epistemological ground.

In the process display method, the background area including an expanded E-R model characterized in that E (entity) and R (relationship) of an E-R model are related to activity and dependence relationship respectively and that a polynomial link of n to m is allowed in R as shown in FIG. 4 and a model represented by the expanded E-R model as shown in FIG. 6 is represented in a background color or by area contour lines as an. epistemological ground.

In the process display method, the number of dependence relationships between activities is not necessarily one and thus display of all dependence relationships between activities may become intricate. In this case, the dependence relationship to be displayed can be specified by the attribute and attribute values of the dependence relationship. For example, only the dependence relationships with the same basic type or the same handled resource can be displayed. Likewise, the activities and the resources to be displayed can also be specified by the attribute and attribute values thereof.

Thus, for example, if the dependence relationships are limited to the "move" type for display, a so-called work flow can be displayed. For example, if the resources are limited to production resources of materials, parts, and products for display, a so-called supply chain can be displayed.

Classification Structure Display Method

In a classification structure display method, the background area including an expanded E-R model characterized in that E (entity) and R (relationship) of an E-R model are related to classification target and abstract-concrete (Is-a) relationship, inclusion (Part-of) relationship, or cluster relationship respectively and a classification structure represented by the expanded E-R model can be represented as an epistemological ground.

In the classification structure display method, the background area including an expanded E-R model characterized in that E (entity) and R (relationship) of an E-R model (entity-relation model) are related to classification target and abstract-concrete (Is-a) relationship, inclusion (Part-of) relationship, or cluster relationship respectively and a classification structure represented by the expanded E-R model is represented as an epistemological ground.

E which becomes the classification root, E which becomes a branch bundling a plurality of entities, and E which becomes a classification leaf are introduced as abstract elements as labels required for easy understanding on classification although actually corresponding components do not exist from the practical demand.

Detailed Data Structure

Figure 19A:
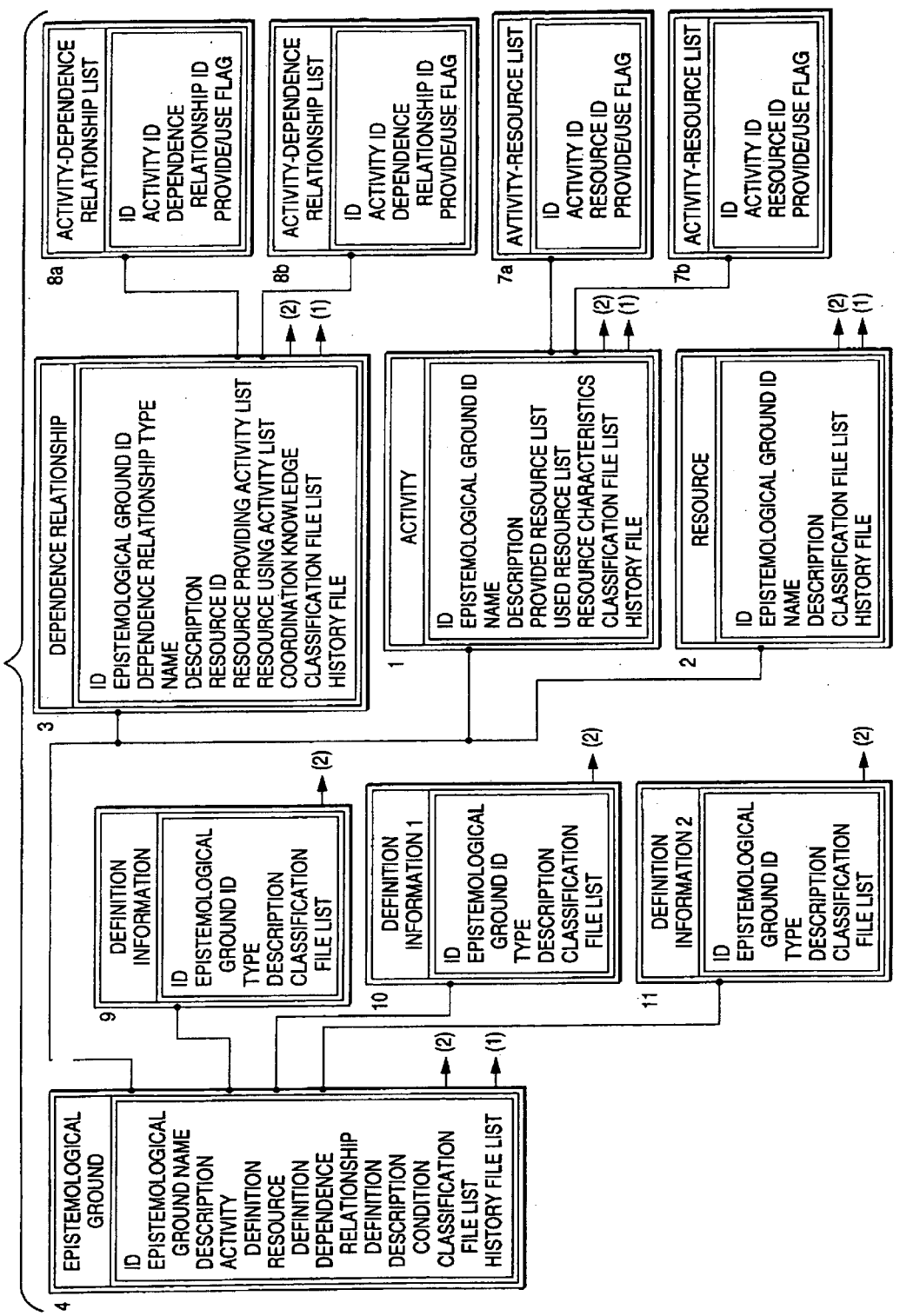

FIGS. 19A and 19B show an embodiment of data structures required for realizing the system.

Numeral 1 shows the data structure of activity, numeral 2 shows the data structure of resource, numeral 3 shows the data structure of dependence relationship, numeral 4 shows the data structure of epistemological ground, and numeral 5 shows the data structure of global epistemological ground. A process is represented by the data. The data structure of process classification is formed using a set, an array, or a linked list provided by a normal programming language or a database description language for the data IDs.

The data is prepared based on the data structures. As an installation method, for a relational database model, the data structure is defined as relation and data is described for each type. For a class base object oriented model, the data structure is defined as cluster and data is prepared as instance. For a prototype base object oriented model, the data structure is defined as a prototype containing default values and data is described by copying and editing from the prototype.

The activity 1 has a list of resources provided by the activity 7a and a list of resource used by the activity 7h as internal structure. The dependence relationship 3 has a resource providing activity list 8a and a resource using activity list 8b for the activities depending on each other with the dependence relationship as internal structure.

The epistemological ground 4 has definition information 9 for activity, definition information 10 for resource, and definition information 11 for dependence relationship as internal structure to describe conditions and definition proper to an arbitrary target area when the activity 1, the resource 2, and the dependence relationship 3 are used for process description of the arbitrary target area. Definitions of the activity, the resource, and the dependence relationship as the initial value of the system independent of the arbitrary target area are described in the definition information referenced from the global epistemological ground 5. To create a new epistemological ground corresponding to a new target domain, the global epistemological ground 5 is used as a model or a prototype. The global epistemological ground has definition information 6 for creating a new epistemological ground.

Data classification of the activity 1, the resource 2, and the dependence relationship 3 can be represented by various classification structures typified, for example, by cluster relationship 15, abstract-concrete relationship 16, and inclusion relationship 17, and a classification file 14 filing them is provided.

The epistemological ground 4 and the global epistemological grounds have the same data structures, but have attribute fields different in meaning concerning classification information. In the classification information of the epistemological ground 4, a classification file filing pointers to the classification structures containing the epistemological ground is retained for efficient structure retrieval and classification edit; in epistemological ground classification in the global epistemological ground 5, a classification structure classifying all the epistemological ground data existing in the database is retained. Only one global epistemological ground exists in the database.

For the activity 1, the resource 2, the dependence relationship 3, the epistemological ground 4, the global epistemological ground 5, a history concerning operation of data creation, edit, reference, etc., can be recorded as history 13 and a history file 12 is provided. However, the global epistemological ground is edited for use as a model or prototype of creating a new epistemological ground and change or correction of the global epistemological ground cannot be reflected on the global epistemological ground.

The history information of the epistemological ground data is edited, whereby use as a guideline of process description can be made in such a manner that the description conditions of the activity, resource, and dependence relationship in the epistemological ground are described gradually and global description is prompted at the initial stage of the process description and detailed description is prompted at the later stage.

FIGS. 20A and 20B show examples of data structures of the epistemological ground 234, activity 231, resource 233, and dependence relationship 232. FIGS. 21A and 21B show examples of data structures relevant to the classification information such as classification file 235, cluster relationship classification 236 and inclusion relationship classification 237. FIGS. 22A and 22B show examples of data structures relevant to the history information.

Process Description and Registration Examples

Figure 23:
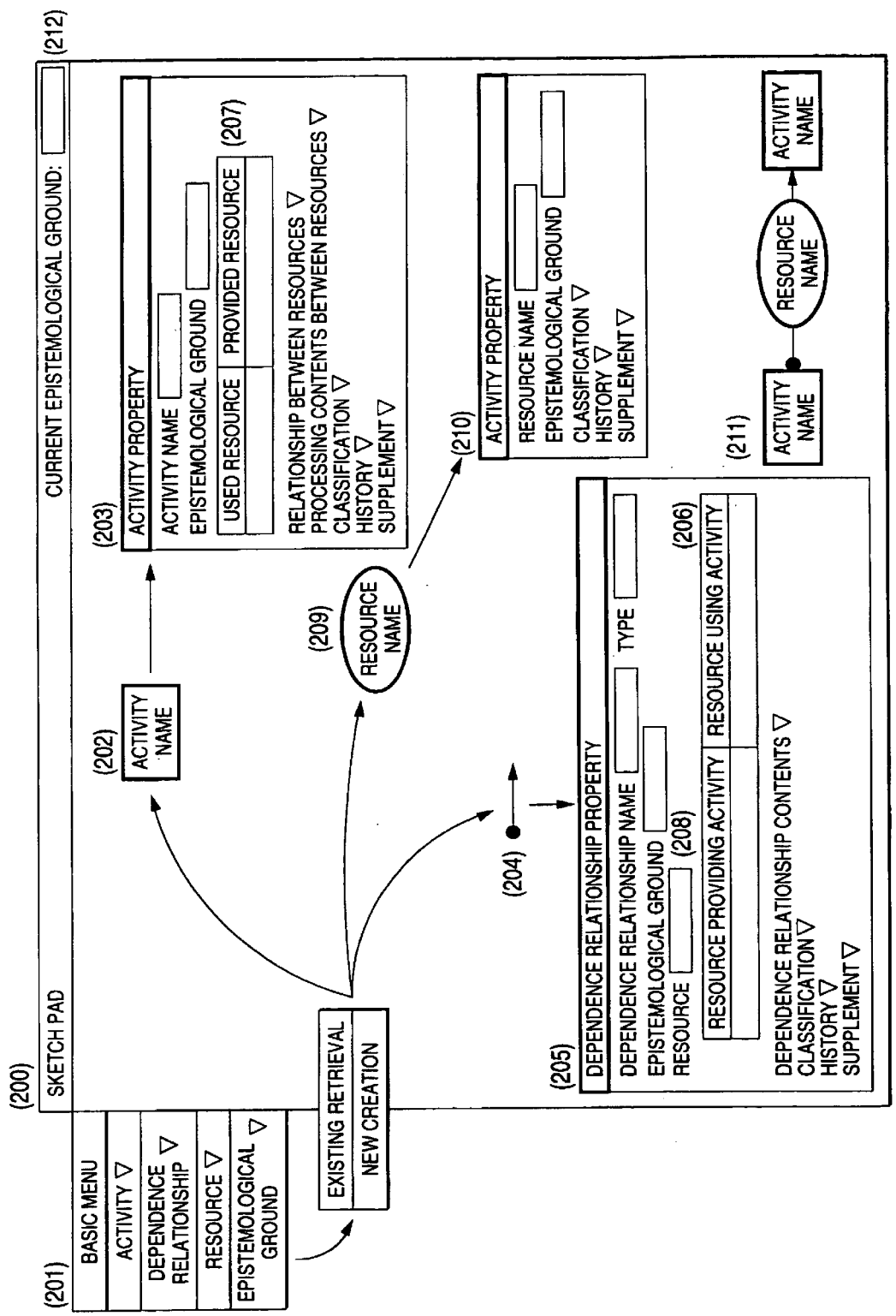
FIG. 23 is a drawing to describe a creation example of data.

A process is described and registered as follows:

In FIG. 23, in a process description sketch pad (200), the basic configuration of the process to be described is created using the default activity and dependence relationship. At this time, the epistemological ground becomes the global epistemological ground.

In FIG. 23, to prepare activity data, activity in a basic menu (201) is selected and existing retrieval or new creation is selected. If the new creation is selected, a default figure (202) of activity is displayed. A property (203) of the activity figure (202) is opened and the attributes of the activity are described. As an alternative method, if a dependence activity list table (206) in a dependence relationship property (205) is selected, a menu for selecting existing retrieval or new creation is displayed and activity data can be prepared in a similar manner to that with the basic menu.

To prepare dependence relationship data, dependence relationship in the basic menu (201) is selected and existing retrieval or new creation is selected. If the new creation is selected, a default figure (204) of dependence relationship is displayed. The property (205) of the dependence relationship figure (204) is opened and the attributes of the dependence relationship are described.

In the dependence activity list table (206) in the dependence relationship property (205), the dependence activity type is determined by the number of resource providing activities and that of resource using activities.

The six types of dependence relationship will be discussed.

The term "transfer" means a so-called resource flow and is used for representation of dependence relationship such that the processing result of one activity is given as an argument to the next activity like an argument and a return value of a function type programming language.

The term "distribution" means so-called resource sharing and is used for representation of such a case where the resource of a warehouse is shared by a plurality of processes in distribution of logistics.

At this time, the method of sharing the resource of the warehouse in a space division manner or a time division manner is described as two coordination methods of the dependence relationship and comparison information of the two coordination methods is described as in the example in FIG. 5, whereby the coordination method appropriate for the purpose of the process design can be selected.

Further, in the example, if the warehouse space is variable and can be allocated, the activity of providing the resource of the warehouse space has the dependence relationship with a plurality of activities using the warehouse and thus this case is represented as the dependence relationship type of "transfer and distribution."

The term "binding" means that a plurality of activities provide one resource, and is used for representation of the case where one argument is returned as a plurality of processing results in cooking, product assembling, or parallel processing of computers.

At this time, for example, if seasoning of cooking depends on the customer, a plurality of cooking activities depend on the customer and thus this case is represented as the dependence relationship type of "binding and transfer."

Further, the dependence relationship of the case where cooking is supplied to different customers at the same time or in time series is represented as the dependence relationship type of "binding and distribution."

In another example, to represent a process of a human system in groupware or organization theory, the term "binding and distribution" can also be used to represent such a situation in which mutual reaction affects mutual action in the case where a plurality of persons listen to a dialog or a plurality of audiences share a work joined by a group art like jazz or drama.

The four dependence relationship types can also be grasped as activities. For example, "binding" can be grasped as the activity of binding a plurality of resources into one different resource. In the case of describing as dependence relationship, an internal process can be described as a plurality of coordination methods. In the case of describing as activity, one process description results, but a plurality of dependence relationships from another activity can be described. Thus, the criterion for representing whether one process is described as activity or dependence relationship is described in an epistemological ground as a policy of analysis for each target domain, whereby intuitively easy-to-understanding description with redundancy reduced can be made.

Referring to FIG. 23, resource data is created by selecting resource in the basic menu (201). To create resource data out of the basic menu (201), the resource in a basic menu is selected and existing retrieval or new creation is selected. If the new creation is selected, a default figure (209) of resource is displayed. A property (210) of the resource figure (209) is opened and the attributes of the resource are described. As an alternative method, if a use resource list and provided resource list table (207) of the activity property (203) is selected or resource (208) of the attribute of the dependence relationship property (205) is selected, a menu for selecting existing retrieval or new creation is displayed and resource data can be prepared in a similar manner to that with the basic menu.

If the activity data, the dependence relationship data, and the resource data are defined as the data related to each other, the figures are displayed in the visually connected form as shown in (211).

Figure 24:
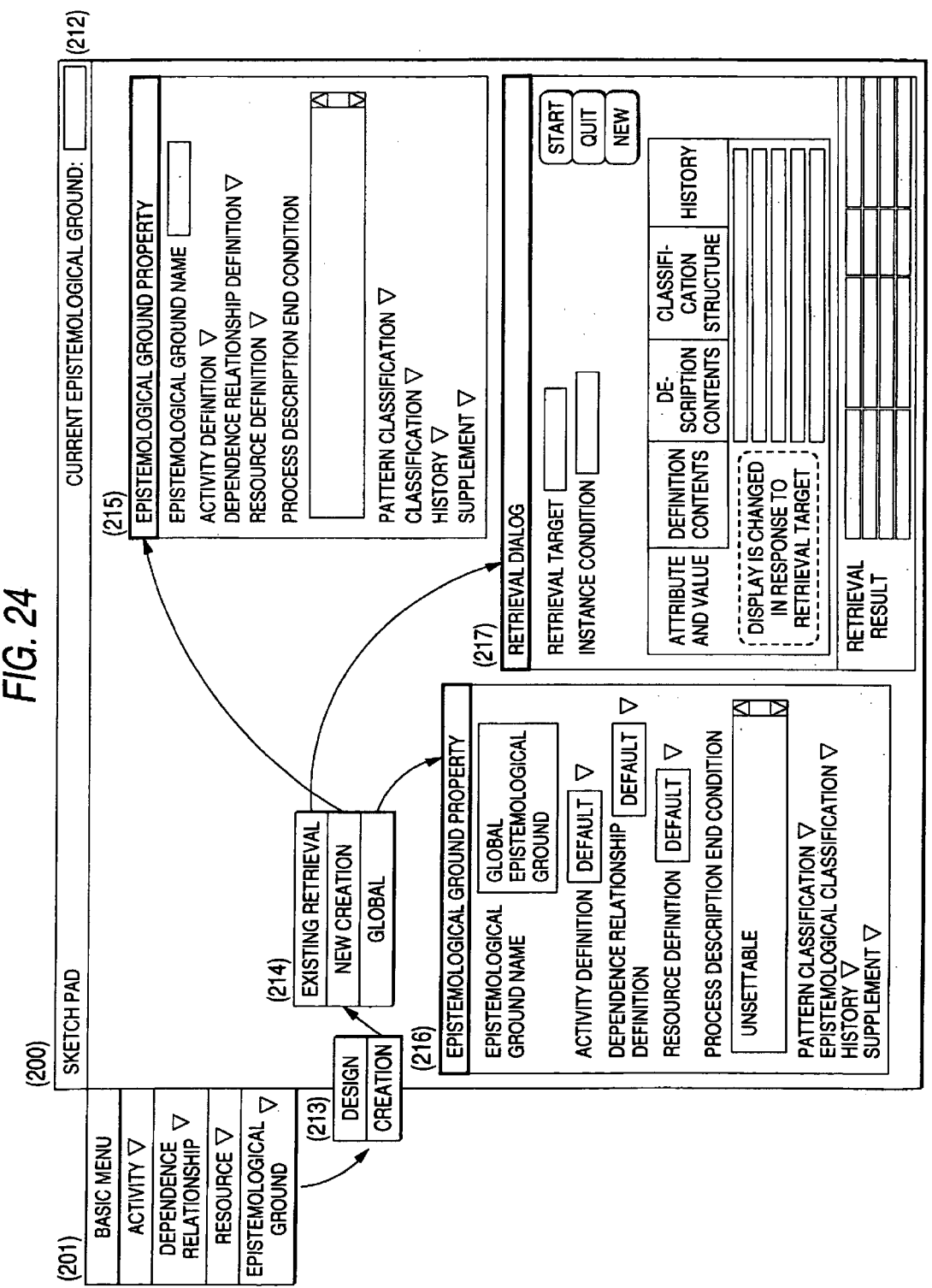
FIG. 24 is a drawing to describe a creation example of data.

In FIG. 24, to create epistemological ground data, epistemological ground in the basic menu (201) is selected and edit is selected out of a submenu for selecting design or creation and existing retrieval, new creation, or global is selected out of the subsequent submenu (214). If new creation is selected, an epistemological ground property (215) is displayed. If global is selected, a global epistemological ground property (216) is displayed. The global epistemological ground is an epistemological ground for defining initialization of all data and the global epistemological ground data is the only one data and cannot be changed or corrected. The epistemological ground name set to make process description in the current sketch pad (200) is displayed in a label (212) in the upper-right corner.

If design is selected out of the submenu (213), a new sketch pad is displayed and a retrieval dialog box (217) of epistemological grounds for setting an epistemological ground is opened. If existing retrieval is selected out of the submenu of activity, resource, or dependence relationship in the basic menu (201), the retrieval dialog box (217) is also displayed. As the retrieval conditions, the component type selected out of the basic menu (activity, resource, or dependence relationship), epistemological ground setting in the sketch pad, and the like are input automatically. However, if existing retrieval is selected from the epistemological ground, the classification registered in the epistemological ground classification of the global epistemological ground is to be retrieved.

Figure 25:
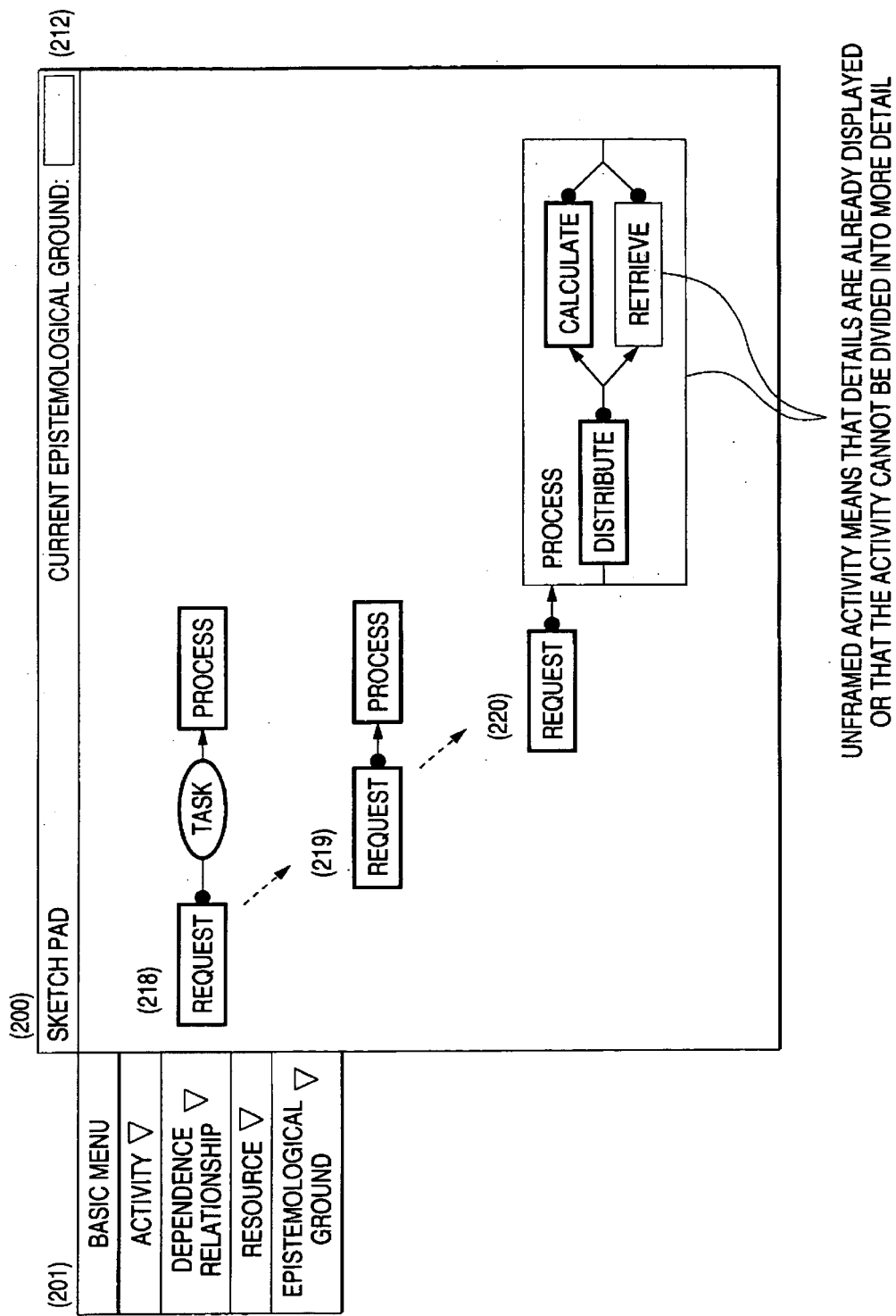
FIG. 25 is a drawing to describe a creation example of data.

In FIG. 25, in process description (218), process description (219) stopping resource figure indication from the point of easy viewing and process description (220) wherein activity "process" is divided into details and "distribute," "calculate," and "retrieve" are displayed are shown. The process description wherein activity "process" is divided into details (network structure made up of combinations of dependence relationship data containing resource data and a plurality of activity data pieces) is retained as the attribute of the resource processing contents of the activity "process." The whole-part relationship between the activity "process" and the activities "distribute," "calculate," "retrieve" is classified in the classification structure of the inclusion (Part-of) relationship referenced from the classification structure of the activity definition of the epistemological ground to which the activities belong.

Figure 26:
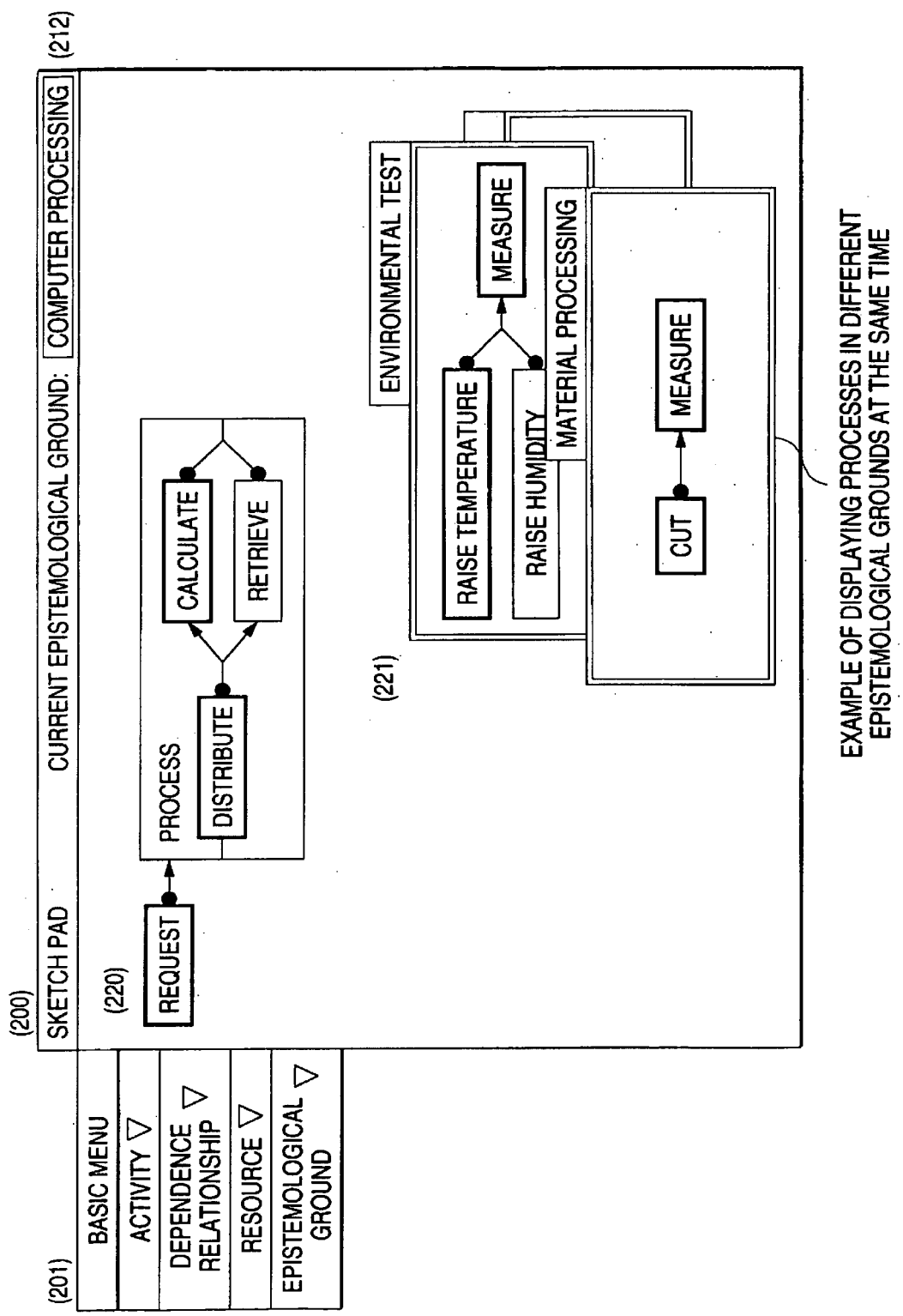
FIG. 26 is a drawing to describe a creation example of data.

As show in FIG. 26, to display processes in different epistemological grounds on the sketch pad, they are displayed in an easy-to-understanding format by representing process description borderlines and the epistemological ground names as shown in (221). Likewise, the classification structures and history information in different epistemological grounds are also displayed on a single sketch pad by a similar identification method.

A specific process description example is shown. An embodiment wherein the process to be described is "print processing" (Request 220) of the domain of "computer processing," (212) output from a word processor to a printer, will be described.

First, the global epistemological ground is edited, whereby a new epistemological ground is created and is saved with the name "information processing system." The ID of the epistemological ground is set automatically by the system. A new activity is created in the new epistemological ground and the name "print processing" is given. The ID of the activity and the epistemological ground ID are set automatically by the system.

Next, the resources used by the activity "print processing" are created. Generally, a printer, power supply, paper, ink, an installation location, the print required time, a print job, and the like can be named as the resources required for print processing. Printed matter exists as the resource provided by the "print processing."

For the resources which need not be described on describing the process in the epistemological ground "information processing system," of the above-mentioned resources, the fact that the description is not required is described in definition of the resources in the epistemological ground.

To describe in a natural language, for example, "resources not required for logic design of information processing system are not described as resources required for activity. For example, resources of system power supply, consumable items, installation location, required time for processing, etc., are not described" is described. As another example, the resources can also be described in conditional expressions. In this case, the condition indicating that the resources classified into consumable items and the resources classified into location, time, etc., are not contained is described in an arbitrary classification structure wherein the resources are later classified, whereby automatically a warning can be displayed for erroneous input.

If the epistemological ground is "office layout" rather than "information processing system," it is obvious that power supply and installation location become indispensable as the resources to be described.

Next, "printer," "print job," and "printed matter" are created as new resources. "Printer" and "print job" are registered in the use resource list and "printed matter" is registered in the provided resource list as the attributes of the activity "print processing."

Next, a coordination method of the process for processing a plurality of print jobs on one printer is described. Here, the dependence relationship "resource distribution" is used. In this case, it is made up of the resource "printer" and two activities "print processing A" and "processing B" using the resource in a distribution manner. At this time, dependence relationship occurs between the two activities via the resource "printer" and thus dependence relationship type "distribution" is newly created and is given a name of "printer sharing".

The ID of the dependence relationship "printer sharing," the epistemological ground ID, and the dependence relationship type are set automatically by the system. The resource ID is input automatically by the system as the resource "printer" is specified. The user registers the activities "print processing A" and "print processing B" directly in the resource using activity list or specifies them, whereby the system automatically enters the activities in the dependence activity list. For the dependence relationship type "distribution," the resource providing activity list is empty.

Next, a dependence relationship coordination method is described. It is described in the dependence relationship contents. A plurality of coordination methods, comparison information of the coordination methods, and the like are described in the dependence relationship contents.

In the example, two general coordination methods are described in the dependence relationship "printer sharing." One is a method of providing a flag indicating a ready state of the printer and using the printer and the other is a method of recording the use order of the printer and providing the printer in the order.

For example, to describe two coordination methods,

"Coordination method 1: Printer provides a flag indicating a ready state and seeing the flag, each activity uses the printer" and "Coordination method 2: FIFO stack is provided, requests for using printer are recorded in time series, and the printer resource is provided in the arrival order" can be described.

Further, comparison between the two coordination methods is described as comparison information as follows:

"Coordination method 1 can be realized using a one-bit flag. Acceptance of requests lacks the order property and resource distribution depends on the flag check frequency and timing from the activities" and "Coordination method 2 requires management means for recording print job requests. Acceptance of requests has the order property and each activity may issue one print job request."

The coordination methods and the comparison information can also be described in the form of referencing a general document file, a table file, a figure file, or an HTML file.

Next, the dependence relationship "printer sharing" is registered in the Is-a classification of the dependence relationship of the classification information in the global epistemological ground. "Distribution" is followed to the subordinate from among the six superordinate types of the Is-a classification tree and printer sharing is registered in the subordinate of sharing.

Next, any other data registered in sharing is checked and a coordination method adjusting the dependence relationship under a similar condition is found.

For example, "water mill sharing," "memory space sharing," etc., exists as any other data, and coordination methods concerning "water mill sharing" include "raising a busy flag on the roof of the mill," "putting a user list in arrival order on a door," "previously issuing tickets so that the use times of the user become uniform although requests are handled in the arrival order," and "the water mill key is circulated as a use license." The method of issuing tickets so that the use times of the user become uniform can be found from among them as a hint on a new coordination method. Thus, as a method of equally sharing one printer, a coordination method of controlling the upper limit of the processing capability of one printer according to the ticket amount and dividing the tickets by the number of users can be gotten easily and is installed in the information processing system, whereby new process design is made possible.

For example, in the above-mentioned example, the coordination method of "raising a flag" corresponds to the technique of polling or semaphore and the coordination method of "circulating a key" corresponds to the technique of mutex, etc.

According to the invention, processes in different fields and businesses can be put into a database in common and to analyze, retrieve, and design a process, the most of the process knowledge across fields can be made.

What is claimed is:

1. An automated process description apparatus for describing a process using a model wherein a plurality of activities have dependence relationships via a resource, the process description apparatus comprising:

means for storing a plurality of definitions of epistemological grounds for domains of the process to be described;

means for storing attributes of the activities of the process to be described for each of the epistemological grounds;

means for storing attributes of the resource of the processes to be described for each of the epistemological grounds;

means for storing attributes of the dependence relationships of the process to be described for each of the epistemological grounds;

means for inputting a definition of the epistemological grounds for classifying the process;

means for analyzing and describing the process from the attributes of the activities, the attributes of the dependence relationship, and the attributes of the resource of the process based on the defined epistemological grounds;

means for determining whether or not an end condition of description defined in the epistemological grounds is satisfied;

means for repeating the inputting and analyzing steps until the end condition is determined to be satisfied;

means for characterizing an E-R model, wherein E and R of the E-R model are related to activity and dependence relationship respectively and a polynomial link of n to m is allowed in R; and means for displaying the activities, the resource, and the dependence relationship as figure elements, wherein the epistemological grounds includes constraint information concerning definitions of the activity, resource, and the dependence relationship, and sets a purpose or a course of the process to be described on the basis of the domain.

2. The automated process description apparatus of claim 1, further including means for displaying the epistemological grounds as a figure element.

3. The automated process description apparatus of claim 2, wherein the figure element of the epistemological grounds surround the figure element of the activities and the figure element of the dependence relationship.

4. The automated process description apparatus of claim 1, further including:

means for storing classification structures of the epistemological grounds; and means for displaying at least a part of the stored classification structures of the epistemological grounds.

5. The automated process description apparatus of claim 1, further including:

means for storing classification structures of the activities, the resource, and the dependence relationships; and means for displaying at least a part of each of the stored classification structures of the activities, the resource, and the dependence relationships.

6. The automated process description method of claim 5, wherein the epistemological ground is a component for describing the purpose and course of process description in a target domain in which the process to be described exists, and the contents including information concerning definition of the three components of activity, resource, and dependence relationship are described.

7. The automated process description apparatus of claim 1, wherein the epistemological grounds contain one epistemological ground set by default.

8. An automated process description apparatus for describing a process using a model wherein a plurality of activities have dependence relationships via a resource, the process description apparatus comprising:

means for specifying an epistemological grounds for a domain of the process to be described;

means for storing attributes of the activities of the process to be described for each of the epistemological grounds; means for storing attributes of the resource of the process to be described for each of the epistemological grounds; means for storing attributes of the dependence relationship of the process to be described for each of the epistemological grounds;

means for inputting a definition of the epistemological grounds for classifying the process;

means for analyzing and describing the process from the attributes of the activities, the attributes of the dependence relationship, and the attributes of the resource of the process based on the defined epistemological grounds;

means for determining whether or not an end condition of description defined in the epistemological grounds is satisfied;

means for repeating the inputting and analyzing steps until the end condition is determined to be satisfied;

means for characterizing an E-R model, wherein E and R of the E-R model are related to activity and dependence relationship respectively and a polynomial link of n to m is allowed in R; and means for displaying at least one of the activities, the resource, and the dependence relationships as a figure element, wherein the epistemological grounds includes constraint information concerning definitions of the activity, resource, and the dependence relationship, and sets a purpose or a course of the process to be described on the basis of the domain.

9. The automated process description apparatus of claim 8, further including:
means for storing classification structures of the epistemological grounds; and
means for displaying at least a part of the stored classification structures of the epistemological grounds.

10. The automated process description apparatus of claim 8, further including:
means for storing classification structures of the activities, the resource, and the dependence relationship; and
means for displaying at least a part of each of the stored classification structures of the activities, the resource, and the dependence relationships.

11. The automated process description method of claim 10, wherein the epistemological ground is a component for describing the purpose and course of process description in a target domain in which the process to be described exists, and the contents including information concerning definition of the three components of activity, resource, and dependence relationship are described.

12. The automated process description apparatus of claim 8, wherein the epistemological grounds contain one epistemological ground set by default.

13. An automated process description apparatus for describing a process using a model wherein a plurality of activities have dependence relationships via a resource, the process description apparatus comprising:
means for storing constraints of the process activities, the resource, and the dependence relationships under a predetermined domain identifier for a domain of the process to be described;
means for assigning a domain identifier to the process to be described;
means for describing attributes of the activities of the process to be described under constraints of the assigned domain identifier;
means for describing attributes of the resource of the process to be described under constraints of the assigned domain identifier;
means for describing attributes of the dependence relationships of the process to be described under constraints of the assigned domain identifier;
means for inputting a definition of the epistemological grounds for classifying the process;
means for analyzing the process from the attributes of the activities, the attributes of the dependence relationship, and the attributes of the resource of the process based on the defined epistemological grounds; and
means for determining whether or not an end condition of description defined in the epistemological grounds is satisfied; means for repeating the inputting and analyzing steps until the end condition is determined to be satisfied;
means for characterizing an E-R model, wherein E and R of the E-R model are related to activity and dependence relationship respectively and a polynomial link of n to m is allowed in R; and
means for displaying at least one of the activities, the resource, and the dependence relationships as a figure element,
wherein the epistemological grounds includes constraint information concerning definitions of the activity, resource, and the dependence relationship, and sets a purpose or a course of the process to be described on the basis of the domain.

14. The automated process description apparatus of claim 13, further including:
means for storing classification structures of the epistemological grounds; and
means for displaying at least a part of the stored classification structures of the epistemological grounds.

15. The automated process description apparatus of claim 13, further including:
means for storing classification structures of the activities, the resource, and the dependence relationship; and
means for displaying at least a part of each of the stored classification structures of the activities, the resource, and the dependence relationships.

16. The automated process description method of claim 15, wherein the epistemological ground is a component for describing the purpose and course of process description in a target domain in which the process to be described exists, and the contents including information concerning definition of the three components of activity, resource, and dependence relationship are described.

17. The automated process description apparatus of claim 13, wherein the epistemological grounds contain one epistemological ground set by default.

18. An automated process description method executed by a computer for describing a process with activities, dependence relationships, a resource, and epistemological grounds as four components, the process description method comprising:
describing a target of the real world, to be described as a model of the process in which a plurality of activities operate having dependence relationships via a resource;
describing a course and purpose of a process description proper to a target domain in an epistemological ground as constraints in description of the three components of the activity, the resource, and the dependence relationships;
means for inputting a definition of the epistemological grounds for classifying the process;
characterizing an E-R model, wherein E and R of the E-R model are related to activity and dependence relationship respectively and a polynomial link of n to m is allowed in R;
analyzing and describing the process from attributes of the activities, attributes of the dependence relationship, and attributes of the resource of the process based on the defined epistemological grounds;
determining whether or not an end condition of description defined in the epistemological grounds is satisfied; and
repeating the inputting and analyzing steps until the end condition is determined to be satisfied,
wherein the epistemological grounds includes constraint information concerning definitions of the activity, resource, and the dependence relationship, and sets a purpose or a course of the process to be described on the basis of the domain.

19. The automated process description method of claim 18, further comprising:
describing the dependence relationships based on the resource handled between the activities; and
classifying the dependence relationships into types according to six superordinate classes of resource distribution, resource binding, resource transfer, resource binding and distribution, resource transfer and distribution, and resource binding and transfer.

20. The automated process description method of claim 18, further comprising:
describing a coordination method of coordinating the dependence relationship between the activities as an attribute of the dependence relationship.

21. The automated process description method of claim 20, wherein in the dependence relationship, if more than one coordination method exists, the contents including information concerning comparison of the coordination methods are described.

22. The automated process description method of claim 18, wherein the activity is a component for describing the operation forming a process, the contents including an activity name, the resource involved in the activity, and the details of the activity are described, and the details of the activity are described as the process.

23. The automated process description method of claim 18, wherein the dependence relationship is component for describing the relationship between the activities, the contents including the dependence relationship between the activities when attention is focused on the resource transferred between the activities, and a coordination method of coordinating the dependence relationship are described, and the coordination method is also described as process.

24. The automated process description method of claim 18, wherein the resource is a component for describing the resource transferred between the activities and the contents including a resource name and the nature of the resource are described.

25. The automated process description method of claim 15, wherein a single global epistemological ground independent of a domain exists and definition of the activity, the resource, and the dependence relationship as initial values independent of the domain is described as attributes of the global epistemological ground.

26. An automated process classification method executed by a computer for classifying processes described with activity, dependence relationship, resource, and epistemological grounds as four components, the method comprising:
classifying the three components of the activity, the resource, and the dependence relationship according to various classification structures including meaningful abstract and concrete (Is-a) relationship inclusion (Part-of) relationship indicating composition; and
managing cluster relationship proper to each field and the classification structures as attributes of the epistemological grounds using each component,
wherein the epistemological grounds includes constraint information concerning definitions of the activity, the resource and the dependence relationship, and sets a purpose or a course of the process to be described on the basis of the domain.

27. An automated process classification method executed by a computer for classifying processes described with activity, dependence relationship, resource, and epistemological grounds as four components, the method comprising:
inputting a definition of the epistemological grounds for classifying the process, wherein the epistemological grounds includes constraint information concerning definitions of the activity, the resource and the dependence relationship, and sets a purpose or a course of the process to be described on the basis of the domain,
characterizing an E-R model, wherein E and R of the E-R model are related to activity and dependence relationship respectively and a polynomial link of n to m is allowed in R;
analyzing and describing the process from attributes of the activities, attributes of the dependence relationship, and attributes of the resource of the process based on the defined epistemological grounds;
determining whether or not an end condition of description defined in the epistemological ground is satisfied;
repeating the inputting and analyzing steps until the end condition is determined to be satisfied;
classifying the epistemological grounds according to various classification structures including meaningful abstract and concrete (Is-a) relationship, inclusion (Part-of) relationship indicating composition; and
managing cluster relationship proper to each field and the classification structures as attributes of a global epistemological ground.

28. An automated process classification method executed by a computer for classifying processes described with activity, dependence relationship, resource, and epistemological grounds as four components, the method comprising:
inputting a definition of the epistemological grounds for classifying the process, wherein the epistemological grounds includes constraint information concerning definitions of the activity, the resource and the dependence relationship, and sets a purpose or a course of the process to be described on the basis of the domain;
characterizing an E-R model, wherein E and R of the E-R model are related to activity and dependence relationship respectively and a polynomial link of n to m is allowed in R;
analyzing and describing the process from attributes of the activities, attributes of the dependence relationship, and attributes of the resource of the process based on the defined epistemological grounds;
determining whether or not an end condition of description defined in the epistemological grounds is satisfied;
repeating the inputting and analyzing steps until the end condition is determined to be satisfied;
classifying the four components of the activity, the dependence relationship, the resource, and the epistemological ground according to various classification structures including history information of creation histories, change histories, reference histories, and deletion histories; and
managing the classification structures as attributes of tile epistemological ground using each component.

29. An automated process classification method executed by a computer for classifying processes described with activity, dependence relationship, resource, and epistemological grounds as four components, the method comprising:
inputting a definition of the epistemological grounds for classifying the process, wherein the epistemological grounds includes constraint information concerning definitions of the activity, the resource and the dependence relationship, and sets a purpose or a course of the process to be described on the basis of the domain;
characterizing an E-R model, wherein E and R of the E-R model are related to activity and dependence relationship respectively and a polynomial link of n to m is allowed in R;
analyzing and describing the process from attributes of the activities, attributes of the dependence relationship, and attributes of the resource of the process based on the defined epistemological grounds;

determining whether or not an end condition of description defined in the epistemological grounds is satisfied;

repeating the inputting and analyzing steps until the end condition is determined to be satisfied;

classifying characteristic processes used in specific patterns, such as those frequently used or the well-worn means most frequently used under a specific condition, according to various classification structures including the cluster relationship; and managing the classification structures as attributes of the epistemological ground using each components.

30. An automated process knowledge database apparatus for classifying and retaining process description data describing processes with activity, dependence relationship, resource, and epistemological grounds as four components according to classification structures, the process knowledge database apparatus comprising:

input means for inputting the process description data; retrieval means for retrieving the process description data; edit means for editing the process description data;

database means for managing the process description data, characterizing an E-R model, wherein E and R of the E-R model are related to activity and dependence relationship respectively and a polynomial link of n to m is allowed in R; inputting a definition of the epistemological grounds for classifying the process, wherein the epistemological grounds includes constraint information concerning definitions of the activity, the resource and the dependence relationship, and sets a purpose or a course of the process to be described on the basis of the domain;

analyzing and describing the process from attributes of the activities, attributes of the dependence relationship, and attributes of the resource of the process based on the defined epistemological ground, determining whether or not an end condition of description defined in the epistemological grounds is satisfied, and repeating the inputting and analyzing steps until the end condition is determined to be satisfied;

display means for displaying the process description data; and storage means for storing the process description data.

31. An automated process retrieval method for retrieving a process using a process knowledge database apparatus comprising:

input means for inputting the process description data;

retrieval means for retrieving the process description data;

edit means for editing the process description data;

database means for managing the process description data, characterizing an E-R model, wherein E and R of the E-R model are related to activity and dependence relationship respectively and a polynomial link of n to m is allowed in R;

inputting a definition of the epistemological grounds for classifying the process, wherein the epistemological grounds includes constraint information concerning definitions of the activity, the resource and the dependence relationship, and sets a purpose or a course of the process to be described on the basis of the domain;

analyzing and describing the process from attributes of the activities, attributes of the dependence relationship, and attributes of the resource of the process based on the defined epistemological grounds, determining whether or not an end condition of description defined in the epistemological grounds is satisfied, and repeating the inputting and analyzing steps until the end condition is determined to be satisfied;

display means for displaying the process description data; and storage means for storing the process description data, the method comprising:

retrieving specific information, similar information, peripheral information, target information from the various classification structures with the types, values, or their combinations contained in the attribute information of the activity, the dependence relationship, the resource, and the epistemological grounds as retrieval keys.

32. An automated process design method executed by a computer for designing a new process by retrieving information of a similar process description to the whole or part of the process to be designed using a retrieval method of claim 31, and correcting or expanding a found process model.

33. An automated process analysis method executed by a computer for analyzing a process with activity, dependence relationship, resource, and epistemological grounds as four components, the process analysis method comprising:

inputting a definition of an epistemological ground for classifying the process, wherein the epistemological grounds includes constraint information concerning definitions of the activity, the resource and the dependence relationship, and sets a purpose or a course of the process to be described on the basis of the domain;

analyzing and describing the process from the activity, dependence relationship, and resource of the process based on the defined epistemological grounds; and determining whether or not an end condition of description defined in the epistemological grounds is satisfied;

repeating the inputting and analyzing steps until it is determined that the end condition is satisfied.

34. An automated process analysis method executed by a computer for analyzing a process with activity, dependence relationship, resource, and epistemological grounds as four components, the method comprising:

inputting a definition of the epistemological grounds for classifying the process, wherein the epistemological grounds includes constraint information concerning definitions of the activity, the resource and the dependence relationship, and sets a purpose or a course of the process to be described on the basis of the domain;

characterizing an E-R model, wherein E and R of the E-R model are related to activity and dependence relationship respectively and a polynomial link of n to m is allowed in R;

analyzing and describing the process from attributes of the activities, attributes of the dependence relationship, and attributes of the resource of the process based on the defined epistemological grounds;

determining whether or not an end condition of description defined in the epistemological grounds is satisfied;

repeating the inputting and analyzing steps until the end condition is determined to be satisfied; and describing the process, if the epistemological grounds concerning a domain of the process to be analyzed already exists, while the epistemological grounds is changed gradually based on the history of analysis conducted in the past using the epistemological grounds, whereby the process analysis is advanced.

35. An automated process analysis method executed by a computer for analyzing a process with activity, dependence relationship, resource, and epistemological grounds as four components, the method comprising:
- inputting a definition of the epistemological grounds for classifying the process, wherein the epistemological grounds includes constraint information concerning definitions of the activity, the resource and the dependence relationship, and sets a purpose or a course of the process to be described on the basis of the domain;
- characterizing an E-R model, wherein E and R of the E-R model are related to activity and dependence relationship respectively and a polynomial link of n to m is allowed in R;
- analyzing and describing the process from attributes of the activities, attributes of the dependence relationship, and attributes of the resource of the process based on the defined epistemological grounds;
- determining whether or not an end condition of description defined in the epistemological grounds is satisfied;
- repeating the inputting and analyzing steps until the end condition is determined to be satisfied;
- editing the history of change of the epistemological grounds made in the past as required, if the epistemological grounds concerning the process to be analyzed already exists;
- retaining gradual change of the epistemological grounds in the epistemological grounds history as methodology of process analysis; and
- analyzing and describing the process following the gradual change of the epistemological grounds, whereby the process analysis is advanced.

36. An automated process display method executed by a computer for displaying a process described with activity, dependence relationship, resource, and epistemological grounds as four components, the method comprising:
- representing a background area including an expanded E-R model, wherein E (entity) and R (relationship) of an E-R model are related to activity and dependence relationship respectively and that a polynomial link of n to m is allowed in R, and a model represented by the expanded E-R model, in a background color or by area contour lines as the epistemological grounds,
- wherein the epistemological grounds includes constraint information concerning definitions of the activity, the resource and the dependence relationship, and sets a purpose or a course of the process to be described on the basis of the domain.

37. An automated classification structure display method executed by a computer, comprising:
- representing a background area including an expanded E-R model characterized in that E (entity) and R (relationship) of an E-R model are related to classification target and abstract-concrete (Is-a) relationship, inclusion (Part-of) relationship, or cluster relationship respectively and a classification structure represented by the expanded E-R model as an epistemological ground,
- wherein the epistemological ground includes constraint information concerning definitions of the activity, the resource and the dependence relationship, and sets a purpose or a course of the process to be described on the basis of the domain.

* * * * *